(12) United States Patent
McRae

(10) Patent No.: US 8,237,600 B2
(45) Date of Patent: *Aug. 7, 2012

(54) TELEPHONIC DEVICE INCLUDING INTUITIVE BASED CONTROL ELEMENTS

(75) Inventor: Kimberly A. McRae, Atlanta, GA (US)

(73) Assignee: About Face Technologies, LLC, Atlanta, GA (US)

( * ) Notice: Subject to any disclaimer, the term of this patent is extended or adjusted under 35 U.S.C. 154(b) by 1300 days.

This patent is subject to a terminal disclaimer.

(21) Appl. No.: 11/981,271

(22) Filed: Oct. 31, 2007

(65) Prior Publication Data

US 2008/0180306 A1    Jul. 31, 2008

Related U.S. Application Data

(63) Continuation-in-part of application No. 11/493,357, filed on Jul. 25, 2006, now Pat. No. 8,089,389.

(60) Provisional application No. 60/702,117, filed on Jul. 25, 2005.

(51) Int. Cl.
   *G08C 19/12* (2006.01)
(52) U.S. Cl. .................. 341/173; 341/176; 340/825.22; 340/825.69; 340/825.72
(58) Field of Classification Search .......... 341/173–176; 340/825.22, 825.69, 825.72
   See application file for complete search history.

(56) References Cited

U.S. PATENT DOCUMENTS

| 5,457,448 | A | 10/1995 | Totsuka | 340/825.72 |
| 5,481,256 | A | 1/1996 | Darbee | 340/825.56 |
| 5,545,857 | A | 8/1996 | Lee | 178/18 |
| D380,449 | S | 7/1997 | Palatov | 131/68 |
| 5,675,427 | A | 10/1997 | Miller | 359/142 |
| 5,798,715 | A | 8/1998 | Saperstone | 346/22 |
| 6,292,210 | B1 | 9/2001 | Gerszberg | 348/140.1 |
| 6,369,799 | B1 | 4/2002 | Miceli | 345/167 |
| 6,573,854 | B1 | 6/2003 | Hug | 341/176 |
| 6,750,802 | B1 | 6/2004 | Olen | 341/176 |
| 6,762,773 | B2 | 7/2004 | Kolde | 345/716 |
| 6,882,299 | B1 | 4/2005 | Allport | 341/176 |

(Continued)

FOREIGN PATENT DOCUMENTS

GB    2281138    2/1995

(Continued)

OTHER PUBLICATIONS

Weemote® 3 Sr. TV remote manual, {8/02, Fobis Technologies Inc.}.

(Continued)

*Primary Examiner* — Timothy Edwards, Jr.
(74) *Attorney, Agent, or Firm* — Abelman, Frayne & Schwab

(57) ABSTRACT

A telephonic device includes at least one control element in the form of, or positioned in a configuration on the control device corresponding to, a part of a face. The control element performs a function of the device associated with the part of the face. In certain embodiments, the at least one control element is in the shape and/or position of a mouth for answering an incoming telephone call, placing an outgoing telephone call, activating a microphone, and/or performing mute/unmute functions. In additional embodiments, the at least one control element is in the shape and/or position of an eye for display of one or more stored numbers. In additional embodiments, the at least one control element is in the shape and/or position of an ear for adjusting volume.

10 Claims, 20 Drawing Sheets

U.S. PATENT DOCUMENTS

2003/0231131 A1    12/2003    Dimig .......................... 341/176
2008/0129550 A1*   6/2008    McRae .......................... 341/20

FOREIGN PATENT DOCUMENTS

| | | |
|---|---|---|
| JP | 07-3200754 | 12/1995 |
| WO | WO01/82046 A2 | 11/2001 |
| WO | 2005/077083 | 8/2005 |

OTHER PUBLICATIONS

Freire, A., & Lee, K. (2001). "Face Recognition in 4-to 7-Year Olds: Processing of Configural, Featural, and Paraphernalia Information." *Journal of Experimental Child Psychology*, doi:10.1006/jecp.2001.2639.

Nelson, Charles (2001). "The Development and Neural Bases of Face Recognition," *Infant and Child Development* 10:3-18 (2001).

American Medical Association. (1997). "Learning, Play and Your 1-2 Year Old," Jul. 10, 2006, *Medem:Medical Library*.

The Center for Universal Design, N.C. State University. (2000). "Evaluating the Universal Design Performance of Products" Jun. 20, 2006. *The Center for Universal Design*.

Myers Research Institute, (2006). "Montessori-Based Dementia Programming®. Montessori-Based Dementia Programming," *Seminar and Workshop Materials*: Camp, Cameron.

International Psychogeriatric Association, IPA Press Releases, (Aug. 16, 1999). "Retrogenesis: landmark Alzheimer's research adds scientific precision to the phrase." Vancouver, B.C.. *International Psychogeriatric Association*.

Mann WC, Ottenbacher KJ, Tomita MR, & Packard S, "Design of hand-held remotes for older persons with impairments," 1994, *Assistive Technology*. 6(2): 140-146.

Parsons H. McIlvaine, Terner, J, HumRRO International, Inc., Kearsley, George Washington University, "Design of Remote Control Units for Seniors," *Experimental Aging Research*, 20:211-218, 1994.

PCT/US06/29011 ISR and Written Opinion, Aug. 8, 2007.

\* cited by examiner

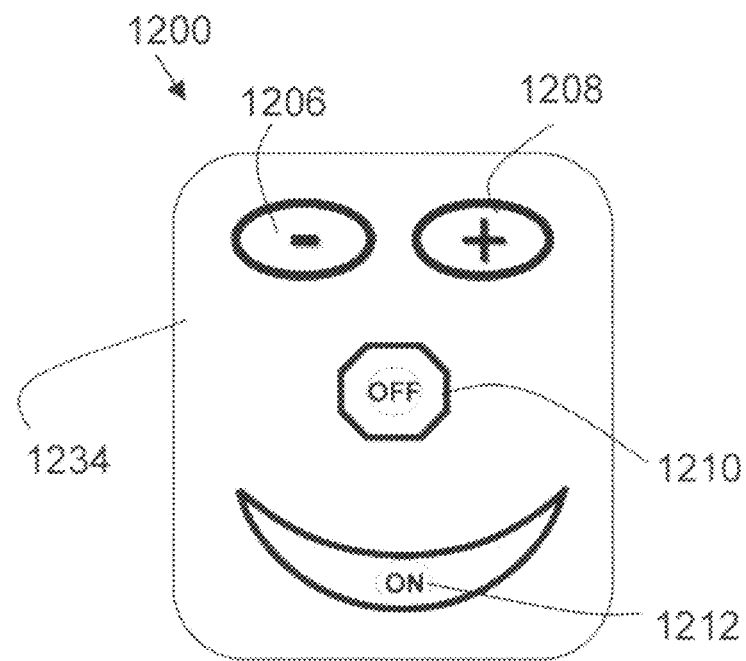
Figure 12
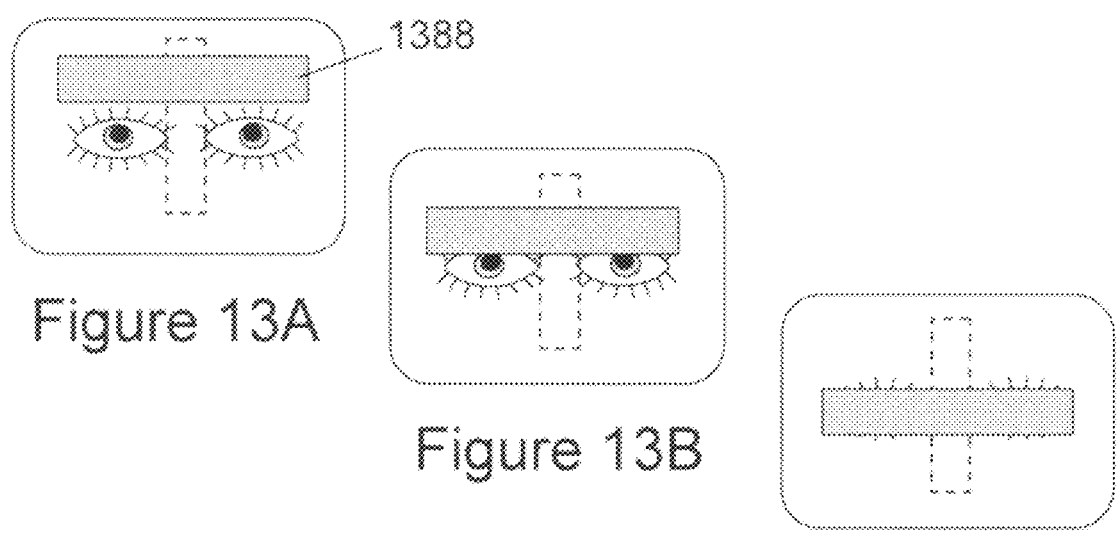
Figure 13A
Figure 13B
Figure 13C

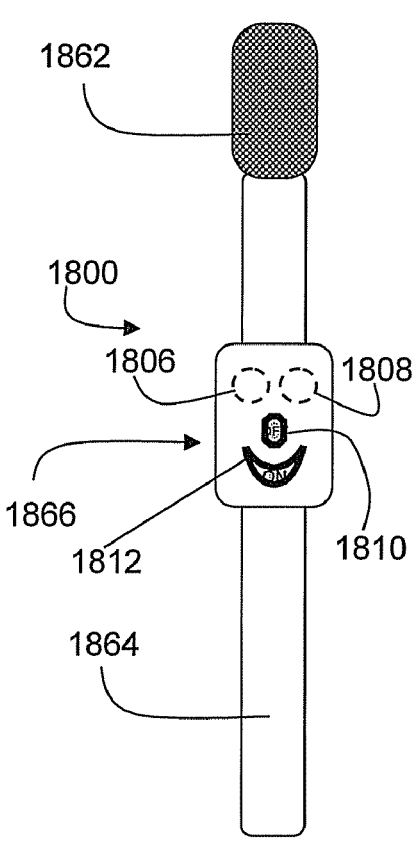
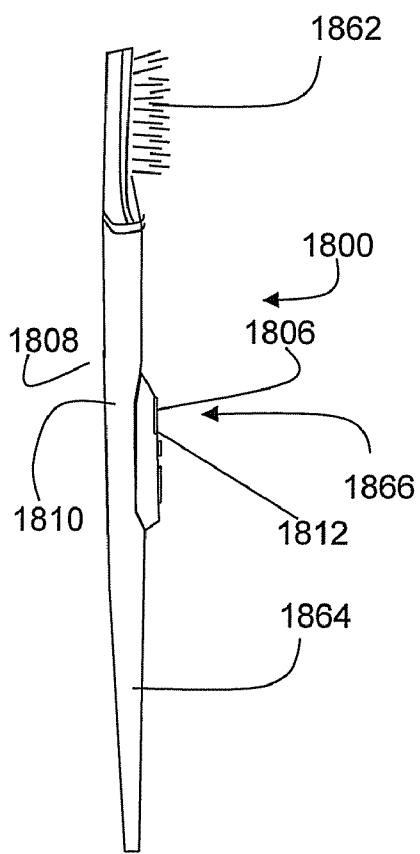
Figure 18A   Figure 18B
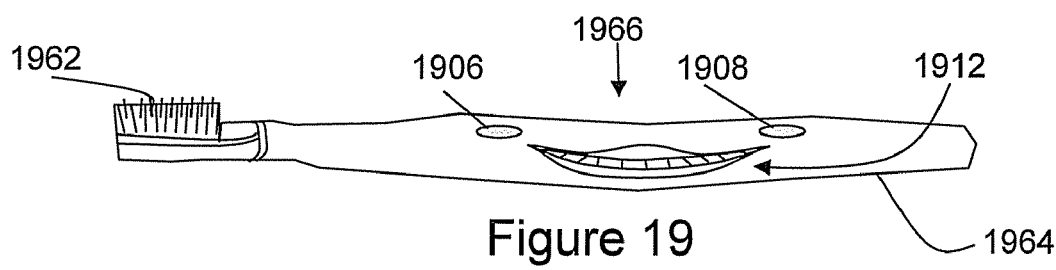
Figure 19
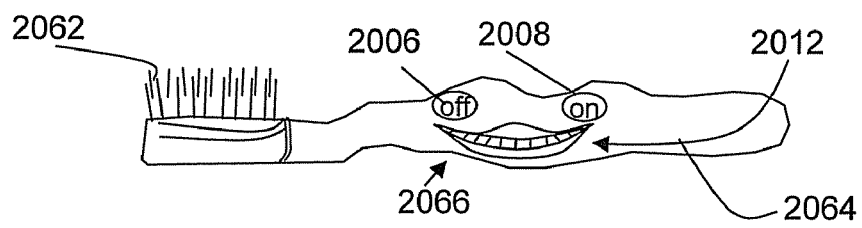
Figure 20

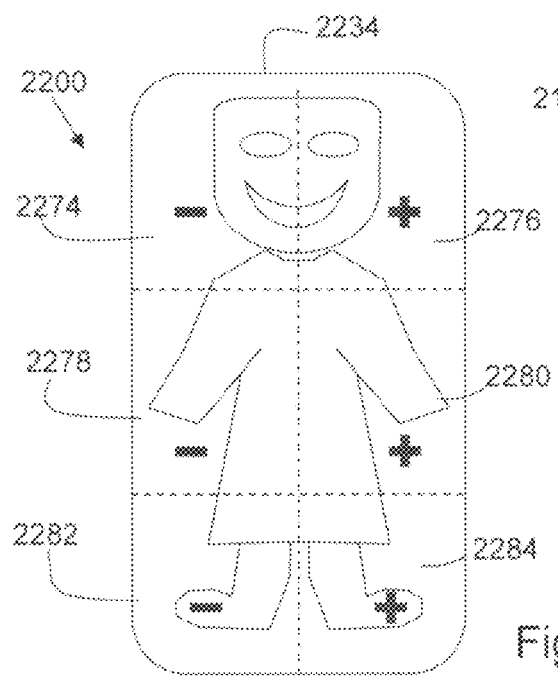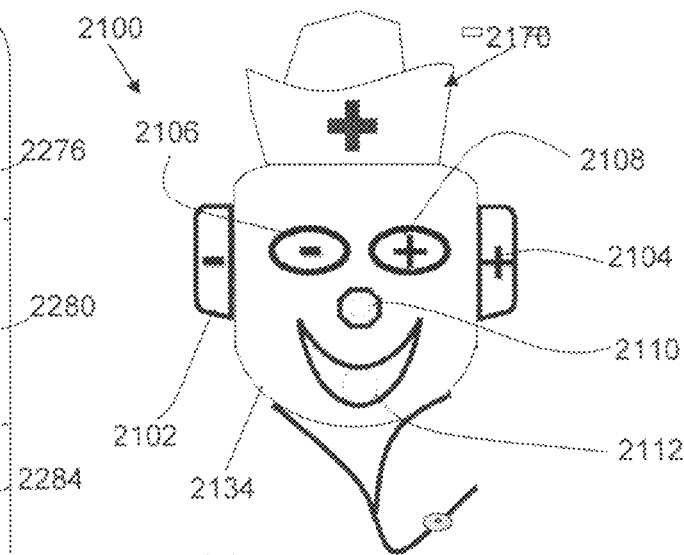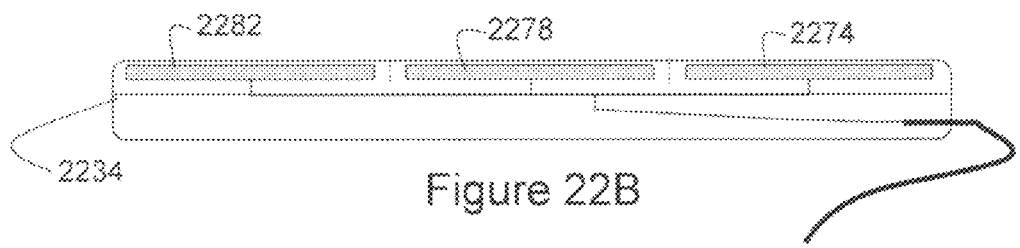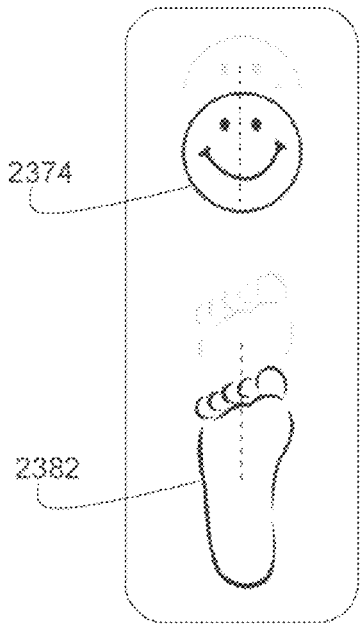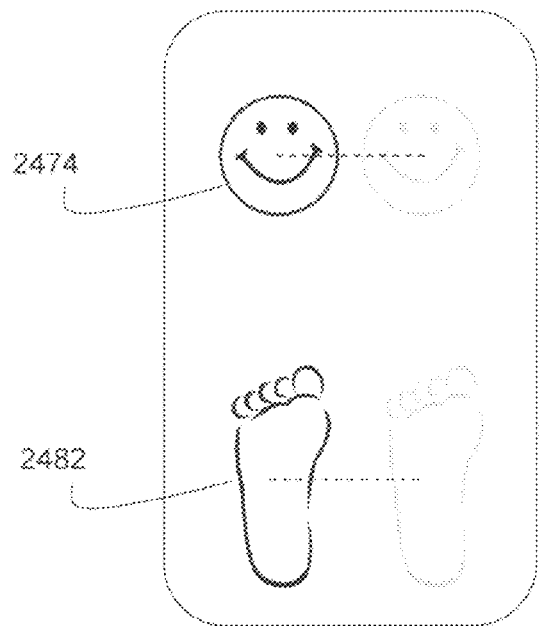
Figure 22A    Figure 21
Figure 22B
Figure 23    Figure 24

TELEPHONIC DEVICE INCLUDING INTUITIVE BASED CONTROL ELEMENTS

CROSS-REFERENCE TO RELATED APPLICATION

This application is a continuation-in-part of U.S. application Ser. No. 11/493,357 filed Jul. 25, 2006, now U.S. Pat. No. 8,089,389, which claims priority under 35 USC 119 to U.S. Provisional Patent Application No. 60/702,117 filed on Jul. 25, 2005 entitled "Man-Machine Interface, or Remote Control, Having Convenient Operation Features", which are both incorporated by reference herein.

BACKGROUND

1. Field of the Invention

The present invention relates to intuitive based control elements, and interfaces and devices using said control elements.

2. Description of the Related Art

Remote control units for televisions are used to control operations of various types of video systems, audio systems, computers, and other devices. Certain types of remote controls are created specific to a particular model unit, while other types of remote controls are universal and can be programmed for the majority of televisions or other devices available on the market today. Remote controls are used to change channels, volume control, on/off control and many other features that different televisions and other devices are equipped with today.

Remote control devices for television sets and other electronic devices fall into two broad categories: those which are hard wired to the appliance, and those which transmit an electromagnetic wave, usually in the infrared portion of the spectrum, which is received and decoded by the appliance. The infrared devices generally comprise a housing having one or more buttons or switches which serve as the user interface, one or more integrated circuits to translate the user command to a digital or binary signal, an infrared light emitting diode (LED) and associated driver circuitry, a power source (usually batteries), and, optionally, a visible LED to signal the user when the remote control unit has power and/or is transmitting.

Most available remote controls for televisions and other equipment have typically been housed in the faun of rectangular slabs, or rectangular slabs with curved portions for design and to enlarge the keypad area. One face of the control typically includes plural control buttons, forming a keypad.

Examples of ergonomically shaped or multi-function remote control units include U.S. Des. Pat. No. 380,449 (shaped like an exercise grip, with or without knurls); U.S. Pat. No. 5,457,448 (round, weighted bottom provided so it always stands upright, with minimal number of keys); U.S. Pat. No. 5,481,256, (includes a scan function to scan channels); and International Patent WO 94/01844 (providing a keypad with geometrical shapes corresponding to the function or number). Further, various pistol shaped remote controls have been disclosed, e.g., in U.S. Pat. Nos. 6,573,854, 5,675,427, U.K. Patent No. 2,281,138.

Further, various user interface based remote control devices are known, including U.S. Pat. No. 6,762,773 (displaying stored icons sharing common visual characteristic with corresponding button on remote control); U.S. Pat. No. 6,292,210 (integrated remote control and phone user interface e.g. for telephone systems, employs user interface which includes graphical screens which can be configured by the user to appear as a picture-in-picture with a video broadcast program); U.S. Pat. No. 6,882,299 (discloses a graphical remote controller for multiple consumer devices including a touch screen based graphical display using title based descriptions to select the appropriate device); U.S. Pat. No. 5,545,857 (discloses a remote control employing a touch screen to reduce the number of keys of the remote controller)

One problem common with many of the above described remote controls is that they are difficult for certain individuals, including young children, elderly, those with severe arthritic or other physically debilitating conditions, or those with Alzheimer's disease, dementia, or other mentally debilitating conditions.

U.S. Pat. No. 6,369,799 discloses a computer pointer control device adapted for ease of use by handicapped individuals. The device includes a mating cradle that sits on top of a base having a track ball. The upper surface of the cradle support is shaped to accept the forearm of an operator. The operator can move the cursor up and down on the screen by pushing his or her arm outwardly or inwardly and can move the cursor left to right on the screen by rotating his or her arm in the cradle about its longitudinal axis.

Certain remote control devices are marketed towards individuals that have trouble with, or do not need, all of the functions available on a standard remote, such as the elderly, people with Alzheimer's Disease or Dementia, those who are cognitively or visually impaired, those who are physically disabled including arthritis sufferers, caregivers, children, or those who do not desire the complex functionality of typical remote controls. For example, referring to FIGS. 31 and 32, certain remote control devices are shown that exist today. These include a conventional Zenith® Universal Remote ZEN-SP, with an on/off button and a circular arrangement of arrow buttons, and the Weemote® 3 Sr. TV remote for adults, marketed by Fobis Technologies, Inc., Pinecrest, Fla. However, the inventor hereof has found that these devices, while promoted as a simple remote control that is customizable, still can be difficult for certain individuals to use.

While these devices and other remote control devices may be suitable for their intended purposes, there remains a need in the art for improved remote control devices, particularly for individuals with limited capabilities.

Other devices also suffer from drawbacks related to ease of use, particularly for the elderly, people with Alzheimer's Disease or Dementia, those who are cognitively or visually impaired, those who are physically disabled including arthritis sufferers, caregivers, children, or those who do not desire the complex functionality of typical device.

"The ability to recognize faces is a remarkable human feat . . . . Our ability to recognize faces is also little affected by the passage of time." Freire, A., & Lee, K, *Face Recognition in 4-to 7-Year Olds: Processing of Configural, Featural, and Paraphernalia Information. Journal of Experimental Child Psychology*, doi:10.1006/jecp.2001.2639 (2001). "Evidence from fields as diverse as cognitive, evolutionary, and developmental psychology, as well as cognitive neuroscience, has increasingly pointed to the 'special' nature of face recognition. A critical examination of the literature supports the view that faces begin to be seen as a separate class of objects within the first 6 months of life. Not surprisingly, the neural systems that underlie face recognition also come on line during this period of time." Nelson, Charles, *The Development and Neural Bases of Face Recognition. Infant and Child Development* 10:3-18 (2001).

The American Medical Association states that, "Between 15 and 18 months, your baby will enjoy language games that ask him to identify things, such as "Where's your ear?" . . . .

At this age, your baby will begin symbolic play for the first time—he'll imitate things he sees you do, and he'll use objects for their intended purpose. He'll attempt to brush his own hair with a hairbrush, or he'll use the phone to "talk" to you.... Your baby may be learning how things work and what things do." American Medical Association, *Learning, Play and Your 1-2 Year Old.* (1997).

Various design principles also are known as attempting to be a medium for simplicity in everyday life, such as the Principles of Universal Design and their guidelines, which state: "Universal Design is the design of all products and environments to be usable by everyone regardless of age, ability or situation.... As universal design performance is increased, so are usability, safety and marketability for all users." The Center for Universal Design, N.C. State University, *Evaluating the Universal Design Performance of Products* (2000). "The intent of Universal Design is to simplify life for everyone by making products, communications, and the built environment more usable by as many people as possible at little or no extra cost. Universal design benefits people of all ages and abilities." The Center for Universal Design, N.C. State University, *About Universal Design (UD)* (2000).

Improvements in quality of life for people with Alzheimer's Disease or Dementia have been proposed based on the Montessori Educational Approach, created by Maria Montessori (1870-1952). "Montessori worked with underprivileged children who were labeled "unteachable." "Her goal in working with these children was to improve their quality of life..." all "based on the abilities available to the children." "The goal of the Montessori method is to create persons who are as independent as possible, able to make choices, and who are treated with respect and dignity. Montessori techniques have traditionally been used with children, but have proven effective when used with older adults. Montessori-Based Dementia Programming® enables older adults to interact positively with their environment and function at the highest level possible."

"Our lives are defined by what we do. Everything we do, from the time we wake up, to the time we eat dinner... is an activity. A persons' self-identity, self-esteem, and mood can be greatly influenced by the activities in one's life and the success or failure experienced during these activities. This remains true even when one develops cognitive impairments." Directions on using "the Montessori Method as a way to CREATE activities" include the following: "(use) materials (that) are familiar, aesthetically pleasing, and are often taken from the everyday environment; materials should be easily recognizable and visible; use of external cues and/or templates is common; the information needed for completing a task should be built into the materials; avoid unnecessary background clutter on materials to prevent distraction; materials should also be free of unimportant letters, numbers, words, and markings; activities should be an error-free source of success for clients...; find and focus on the memories and abilities that are still intact; activities should have a clear objective that is meaningful to the client." Myers Research Institute, *Montessori-Based Dementia Programming®. Montessori-Based Dementia Programming Seminar and Workshop Materials: Camp, Cameron* (2006).

In addition, the "First-In/Last-Out" Theory, is known, which states that "abilities that are acquired first in childhood remain for a long time in persons with dementia. Abilities that are acquired later in childhood are the first abilities lost in persons with dementia." This theory is also known as Retrogenesis, and it "was first presented to the International Psychogeriatric Association on Aug. 16, 1999, by Dr. Barry Reisberg." Myers Research Institute, *Montessori-Based Dementia Programming®. Montessori-Based Dementia Programming Seminar and Workshop Materials: Camp, Cameron* (2006). "Clinical and neurological studies have compared the mental and physical stages of infant and child development to the reverse process of Alzheimer's deterioration. These studies document that an Alzheimer's patient with mental ability and habits similar to those of a 12-year-old child, will regress to levels of successively younger children and even infants." International Psychogeriatric Association, IPA Press Releases, *Retrogenesis: landmark Alzheimer's research adds scientific precision to the phrase.* (1999).

Employing aspects of various theories described above within everyday man-machine interfaces, including remote controls, video devices, audio devices, telephones, computers, clocks, household devices, personal care devices (e.g., toothbrush), light switches, or controls for any other of the multitude of ubiquitous devices, are unknown to the inventor hereof.

SUMMARY

The present invention relates to intuitive based control elements and interfaces and devices using said intuitive based control elements. In certain embodiments, machine interfaces such as remote control devices for operation of various devices are provided. More specifically, machine interfaces according to embodiments of the invention herein include one or more control elements in the form of shapes and/or positioned indicia to facilitate operation by users.

Control elements provided herein having intuitive shapes and/or positions described above as associated with the man-machine interfaces may also be provided integral with various devices. For example, personal electronic devices, personal care devices, personal healthcare devices, communications devices and personal comfort devices may benefit from control elements having intuitive shapes and/or positions associated with the function as described herein.

In one aspect herein, a telephonic device is provided including a control interface. The control interface for the telephonic device includes at least one control element in the form of, or positioned in a configuration on the control device corresponding to, a part of a face. The control element performs a function of the device associated with the part of the face. In certain embodiments, the at least one control element is in the shape of, position of, or both in the shape of and position of a mouth, wherein upon activation of the control element, the telephonic device answers an incoming telephone call or places an outgoing telephone call. In additional embodiments, the at least one control element is in the shape of, position of, or both in the shape of and position of an eye, wherein upon activation of the control element, the telephonic device displays one or more stored numbers (e.g., wherein the user then activates the call, for instance, by activating a control element in the shape of, position of, or both shape of and position of a mouth). In additional embodiments, the at least one control element is in the shape of, position of, or both in the shape of and position of an ear, wherein upon activation of the control element, the telephonic device adjusts a control associated with the volume of the telephonic device (e.g., volume level, muting on/off).

BRIEF DESCRIPTION OF THE DRAWINGS

The foregoing summary as well as the following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown in the drawings, where:

FIG. 12 shows a light switch according to certain embodiments of the present invention;

FIGS. 13A, 13B and 13C show another embodiment of a light switch according to certain embodiments of the present invention;

FIGS. 18A and 18B show front and side views, respectively, of a toothbrush according to certain embodiments of the present invention;

FIG. 19 shows another toothbrush according to certain embodiments of the present invention;

FIG. 20 shows another toothbrush according to certain embodiments of the present invention;

FIG. 21 shows a control device for use in a hospital environment;

FIGS. 22A and 22B show a front view and side view, respectively, of one embodiment of a device for controlling operations of a hospital bed;

FIG. 23 shows another embodiment of a device for controlling operations of a hospital bed;

FIG. 24 shows another embodiment of a device for controlling operations of a hospital bed;

DETAILED DESCRIPTION

A control interface is provided herein. The control interface, or in certain embodiments referred to herein as a man-machine interface, may be embedded within a controller device, e.g., an input or control device separate from the device in which it controls, wherein a control interface may include one or more control elements on or associated with the controller device, either physically (such as buttons or other types of physical control elements) or virtually (in the form of a display such as a touch screen display or other virtual control element). In further embodiments, a control interface may include one or more control elements on or associated directly with the device, either physically or virtually. In still further embodiments, a control interface may include a hybrid of one or more physical control elements and one or more virtual control elements.

Figure 1:
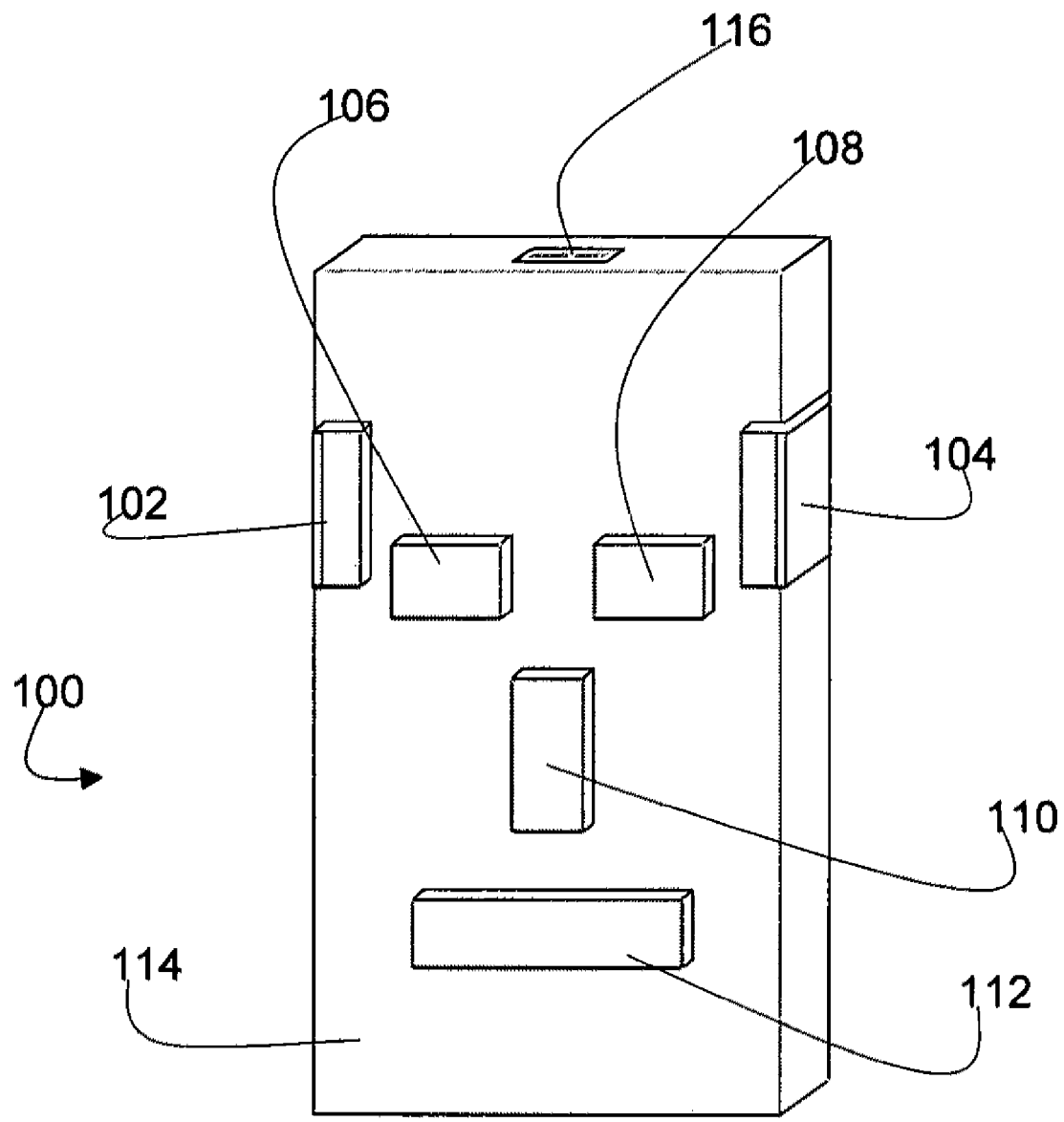
FIG. 1 shows one example of an interface device such as a remote control according to certain embodiments of the present invention.

Referring now to FIG. 1, a man-machine interface 100 (e.g., in the form of a remote control) is provided. Man-machine interface 100 is configured, for example, in the form of a typical remote control, as a rectangular slab. However, in contrast to a conventional remote control, the man-machine interface is provided with control elements 102, 104, 106, 108, 110 and 112 positioned at intuitive locations upon the front surface 114 of the man-machine interface 100. This may be particularly useful for individuals with diminished mental and/or physical capability, or very young children, in that the remote control functionality may be simplified to the bare essential features, with control elements or buttons intuitively shaped and/or positioned upon the remote control device.

For example, as shown, control elements 102, 104 are in the position of ears, and may be pre-set or programmed to control audio functions such as volume or a mute toggle. Also, as shown, control elements 106, 108 are in the position of eyes, and may be pre-set or programmed to control video functions such as channels, programs or files (e.g., on stored media), or other video functions. Control elements 110 and 112, shown in the position of a nose and a mouth, are optionally provided to control power on and off, or other pre-set or preprogrammed functions.

In general, a control element may be shaped in the form of, located in the position of, or both shaped in the form of and located in the position of, a part of a representation of an animate being. The part may correlate with one or more body and/or facial parts. For example, the representation may be in the form of a shaped housing (as described with respect to, e.g., FIG. 2A). In certain embodiments, one or more control elements have a shape that resembles a body and/or facial part. In other embodiments, the positioning and/or configuration of one or more control elements forms a representation of a shape of a face (e.g., as described with respect to FIG. 1).

As mentioned above, the control elements may be physical, for example, buttons or other tangible structures which are actuated. As a control device, these may be in the form of, for instance, a remote control device, computer interface devices (e.g., which connect to a computer as a substitute for, or in conjunction with, one or more existing input devices such as a keyboard, mouse, touchpad, scroll buttons or toggles, and/or dedicated buttons (such as for mute, volume control, or various navigation buttons) on an input device). As a part of another functional device, one or more physical control elements may be shaped control elements and/or an arrangement of control elements In other embodiments, one or more control elements may be viral control elements. For instance, they may appear as a display on a display device. These virtually displayed control elements may be interfaced using a touch screen interface, a pointer device, or a selector (for instance, up/down/left/right selector). In other alternatives, one or more control elements may appear as a projected image from a projection device. These projected control elements may be interfaced using, for instance, a virtual interface projection system such as used with respect to laser keyboards and the like.

In embodiments where plural control elements are included, they may be the same or different. The control elements are capable of actuation upon being depressed, rotated, twisted, pulled, slid, rubbed, touch-screen actuated, manipulated, or any combination of the foregoing actions. The control elements may be binary, e.g., wherein actuation causes a gate within a circuit and/or algorithm to toggle between an open and closed state to perform a task, or other base, for instance tertiary as a three way switch, quaternary, and so on. As an example of a tertiary a control element, either or both control elements 102 and 104 may be tertiary. For instance, the element may be twisted, to control the volume level up or down, or depressed downward, to toggle between mute and unmute. One or more control elements may be provided with scroll functionality, for example, similar to jog wheel functionality known on audio and video devices (for example, control elements in the position of and/or configuration of eyes may scroll as in a track ball application to perform the jog wheel function). Further, while certain embodiments herein depict a pair of corresponding elements (e.g., in the position of and/or configuration of a pair of eyes or a pair of ears) that perform different functions (e.g., left eye to select an image or channel down, right eye to select an image or channel up), these functions may be reversed, or both control elements may be redundant, for example, wherein the control element in the position of and/or configuration of an eye may be rolled about a track or twisted like a dial to control image or channel selection, or wherein control elements in the position of and/or configuration of an ear may be twisted to increase or decrease volume.

As shown, the control elements are positioned at locations on the surface 114 of the man-machine interface 100 housing corresponding to various parts of the face including ears, eyes, nose and mouth. Other parts of the face may also be represented, including cheeks, chin, forehead, or top portions of a head. Further, other body parts including but not limited to arms, hands, legs, feet, chest or belly may be represented. Alternatively, or in combination with control elements in the position of certain facial parts, the control elements may be shaped in the form of a part of the face selected from the group consisting of ears, eyes, mouth, nose, cheek, and chin.

The control elements may be in various configurations and types. For example, they may protrude from the body of the man-machine interface 100 in various three dimensional configurations, or optionally may lie flush or be recessed for certain limited functions. Alternatively, the control elements may be pressure sensors, optical sensors, or heat sensors, in the form of touch pad or screen sensors. In still further alternatives, one or more of the control elements of man-machine interface 100 may be provided in the configuration of sliding controls, roller-ball controls, or other control capable of being manipulated.

Further, various control elements described herein may be of suitable color to further indicate the function, for example, green to turn something on, and red to turn something off. In further alternatives, various control elements described herein may include various lighting enhancement, for example, through a backlight, to indicate operation or other features.

The man-machine interface 100 includes a transmission sub-system (represented schematically with reference to a transmission element 116) for transmitting a signal from the control elements to the device to be controlled. This may be any conventional circuitry or sub-systems for transmitting a signal upon actuation of control elements from the remote device to the device to be controlled. In certain embodiments, it may be desirable to include plural transmission elements and/or sub-systems to allow for multi-directional control of the device to be controlled, which is particularly well suited for people with cognitive disabilities. In particular, where the control elements are intuitively shaped and/or positioned upon the remote control device, the orientation of the device will not be significant to the user. The transmission sub-system may comprise a wireless transmission subsystem such as an IR transmission sub-system, an RF transmission sub-system or an optical transmission sub-system; or a wired sub-system for transmitting via wire signals to the device to be controlled.

The man-machine interface 100 may optionally include (not shown in FIG. 1) a master control device disposed within at least a portion of said body and operably coupled to one or preferably all of the control elements. In this configuration, the transmission sub-system transmits a signal from said master control panel to the device to be controlled. The master control device may include a self contained programmable control device.

The electronics and other transmitter circuitry for wireless or wired transmission of signals may be included in the master control device, or elsewhere in the man-machine interface 100. For example, where the transmitter circuitry is included in the master control device, it may function independently as a man-machine interface or remote control.

The transmission sub-system may be pre-programmed for a certain device or brand of devices to be controlled, or may be programmable by the user or the user's caregiver. For example, the device may be programmed similar to a conventional "universal remote" control device. Alternatively, the man-machine interface herein may be programmable with a master control device described herein. In further embodiments, a computer interface is provided on the device to allow for programming, such as Internet-based programming or other software. The interface may be wired (e.g., a Universal serial bus, serial port connection, parallel port connection, IEEE 1394 connection (Firewire or iLink), ethernet connection) or wireless (e.g., wireless local area network, wireless broadband network, Bluetooth, cellular digital packet technology, wireless metropolitan networks, or other wireless connectivity) For example, in one example, the device may be programmed based on user, parent, guardian or caretaker selections of certain programmed stations within software or a web site displaying a list of stations to select from. Priority may be assigned to certain stations. In other embodiments, a user, parent, guardian or caretaker may program other functionalities of the control interface, e.g., assignment of functions to control elements, association of the device with particular brands of electronic equipment, or other desired features.

A master control device may be in the form of a cartridge or computer media. For example, the cartridge may be programmable upon interfacing with a computer device. The computer device may be dedicated to the man-machine interface 100 herein, or may be integrated in an existing computer device. The computer media may be selected from the group consisting of computer diskettes, flash memory devices, CD-ROMs, DVDs, magnetic hard drives, other forms of media, and combinations comprising at least one of the foregoing media forms.

A computer device to program the master control device described above may include typical personal computer including PC or Apple® based computer, portable computer, PDA, a dedicated computer device used specifically for the man-machine interface 100, embedded computer system within the "machine" to be controlled, or any other suitable computer device, that is programmed with suitable software and/or firmware to control the functionality of the master control device.

The interfaces between the control elements of the man-machine interface 100 and the master device may be by suitable electronic, optical, IR, RF, or wired interface. Alternatively, or in combination, the man-machine interface 100 may include a suitable mechanical or electromechanical interface between the master control device and at least one of the control elements. In certain embodiments, the mechanical interface may be configured for interfacing with an existing remote control device. An existing control device may include a stock remote control device that is sold with the device to be controlled, an after market universal remote control, or a custom remote control device.

Another feature of certain embodiments of the present invention is an optional locator sub-system. For example, when one touches a "locate" button on a base or a device being controlled, or on a finder device, a radio frequency signal is transmitted and the device emits certain audible sounds or programmed recordings.

Another feature of certain embodiments of the present invention is an optional speech generating sub-system. Upon producing a signal with at least one control element, the speech generating sub-system speaks the function of said at least one control element. For example, when the power is turned on, a computer generated voice or pre-recorded voice speaks the phrase "device on" or other suitable phrase.

Embodiments of the present invention in the form of man-machine interfaces or remote control devices may be used independently and in conjunction with existing remote controls for various devices with standard features.

In further embodiments herein, the remote control device may control multiple functional devices and/or appliances. The device may include a suitable selector switch or selector elements, for instance, to switch between or select certain functional devices. For instance, one may switch to or select cable television, satellite television, a video player device (e.g., VCR, DVD or DVR), and/or one or more audio devices.

Figure 2A:
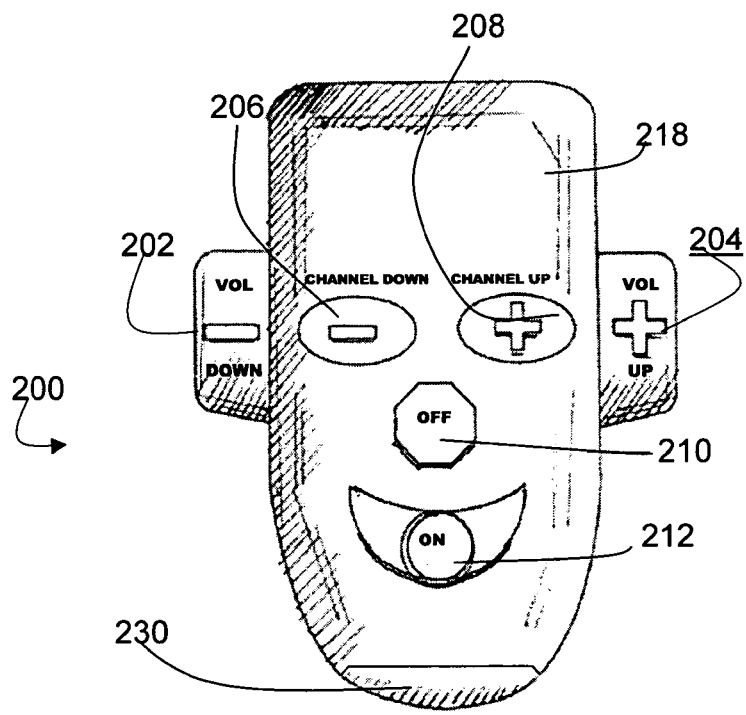
FIG. 2A shows a top view of another example of an interface device such as a remote control according to certain embodiments of the present invention
Figure 2B:
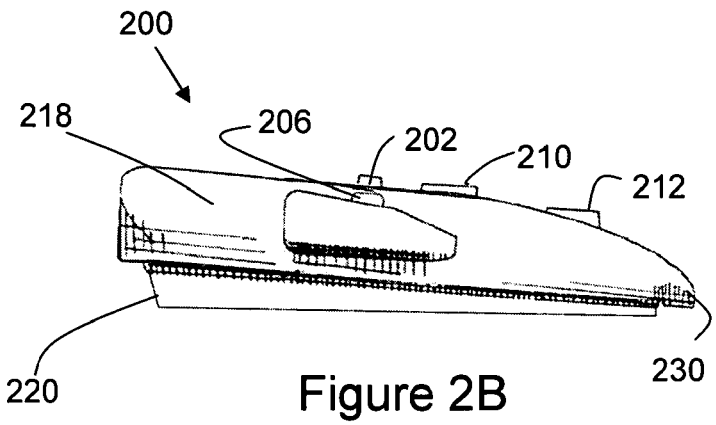
FIG. 2B shows a side view of the example shown in FIG. 2A.
Figure 2C:
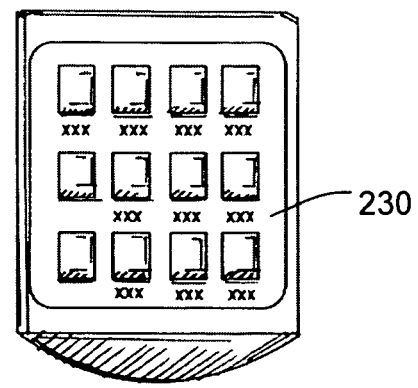
FIG. 2C shows a top view of a master control device used in the example shown in FIG. 2A.

Referring now to FIGS. 2A-2C, another example of a man-machine interface is provided, man-machine interface 200. As shown, the housing 218 is configured in the general shape of a face of an animate being. For example, as shown, control elements 202, 204 are in the position of and general shape of ears, and may be pre-set or programmed to control audio functions such as volume. Also, as shown, control elements 206, 208 are in the position of and general shape of eyes, and may be pre-set or programmed to control video functions such as channels, programs or files (e.g., on stored media), or other video functions. Control elements 210 and 212, shown in the position of a nose and a mouth, respectively, are optionally provided to control power on and off, or other pre-set or preprogrammed functions. Control element 212 may also be in the general shape of a mouth or a smile, for example, indicating device "power on" as conveying a general sense of pleasure to the user. Further, control element 210 may be in the general shape of a "stop" sign, indicating "power off". In preferred embodiments, certain control elements are formed of a pliable material for ease of use. Further, an ergonomic surface and buttons may be provided, for example, buttons of soft plastic for safety and easy handling with a "tactile click" when pushed, to provide additional reinforcement to users as to the function that they are performing.

As described, in a preferred embodiment, at least one of the control elements serves a function naturally associated with the shape of the control element. For example, the control elements in the position of and/or general shape of eyes serve to control video functions; and the control elements in the position of and/or general shape of ears serve to control audio functions.

The housing 218 is configured upon a base 220. The shaped region in the general shape of a face of an animate being may, as shown in the example of FIG. 2B, have a tilted axis with respect to the base.

Also as show in FIGS. 2A and 2B, the control element 210 is positioned on a location of the housing corresponding to a nose. Control element 210 controls power functions, e.g., "power off". Further, the control element 212 is shaped in the form of a mouth, and positioned on a location of the housing corresponding to a mouth. Control element 212 controls power functions e.g., "power on".

As shown in FIG. 2C, a master control 230 is provided that, for example, slidably insertable into and removable from the body of the man-machine interface 200. This master control 230 may be a master control sub-system as described above and interface with the control elements as described above.

The master control 230 may be accessed as shown, or via disassembly of the man-machine interface 200. In certain embodiments, structural insert portions may be provided with the man-machine interface for a particular brand or style of existing remote control. Thus, a user or caregiver will insert the existing remote control in the insert and then insert the assembly into the man-machine interface. Alternatively, a user or caregiver will insert the insert in the slot of the man-machine interface and then insert the existing remote control into the fitted man-machine interface.

Figure 3A:
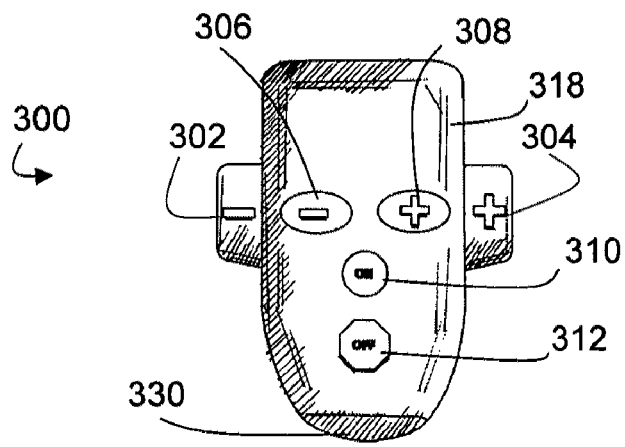
FIG. 3A shows a top view of another example of an interface device such as a remote control according to certain embodiments of the present invention.
Figure 3B:
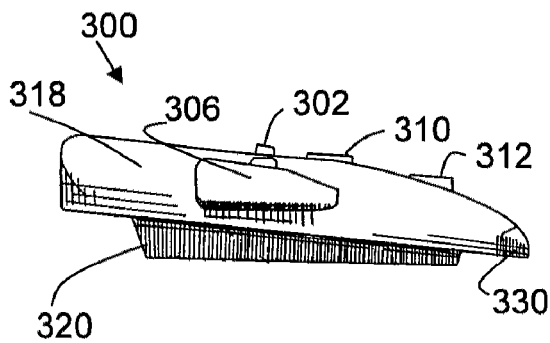
FIG. 3B shows a side view of the example shown in FIG. 3A.
Figure 3C:
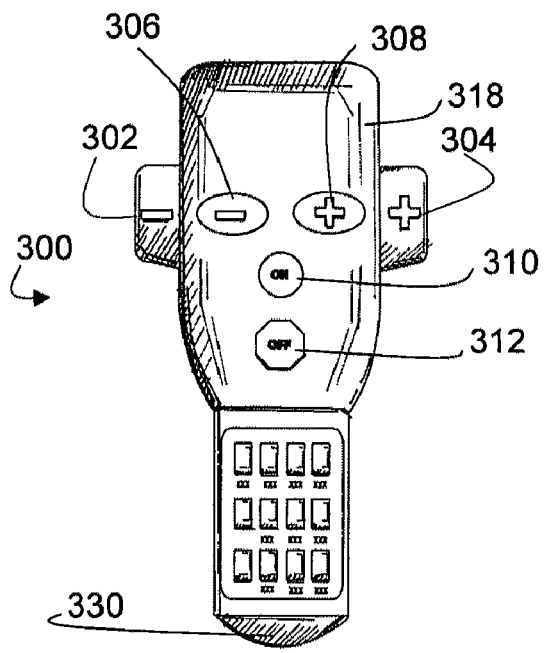
FIG. 3C shows a top view of a master control device extending from a main portion of the interface device shown in the example of FIG. 3A.
Figure 4A:
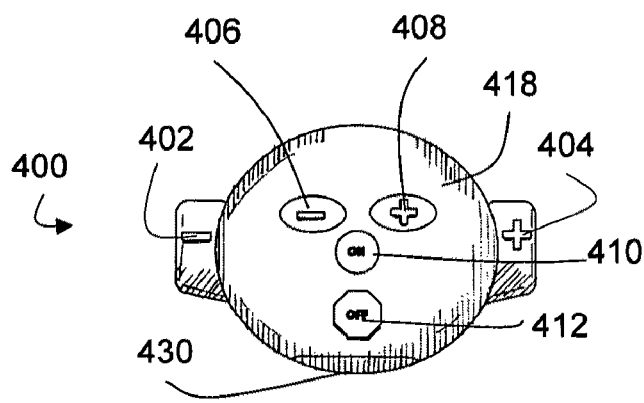
FIG. 4A shows a top view of another example of an interface device such as a remote control according to certain embodiments of the present invention.
Figure 4B:
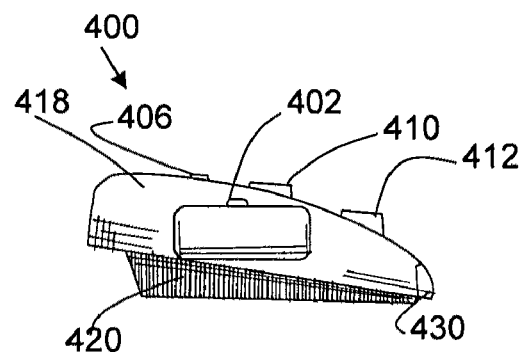
FIG. 4B shows a side view of the example shown in FIG. 4A.
Figure 4C:
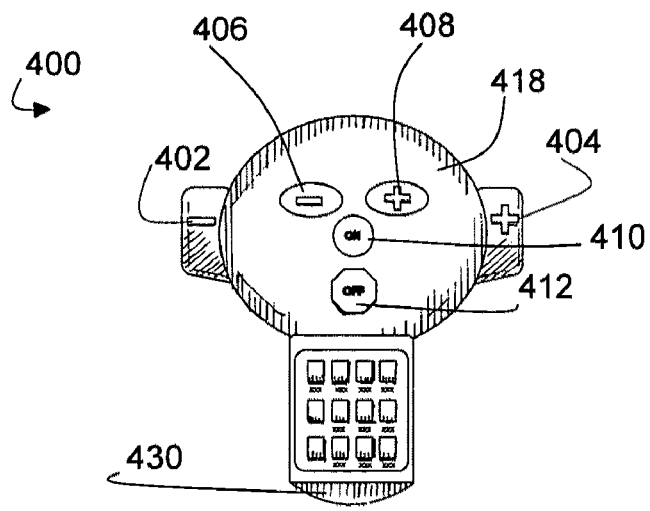
FIG. 4C shows a top view of a master control device extending from a main portion of the interface device shown in the example of FIG. 4A.

FIGS. 3A-3C and 4A-4C show further examples of the herein system, wherein FIGS. 3A-3C show different control elements than FIGS. 2A-2C (particularly, the "power on" is controlled by a round button in the position of a mouth rather than also being in the shape of a smile as in FIGS. 2A-2C), and wherein FIGS. 4A-4C show a man-machine interface in the form of a round head.

Of course, other variations are possible. For example, a remote control device may be provided with typical functionality and additionally include one or more control elements as described herein. For example, buttons may be positioned on a remote control at a location corresponding to "ears" for audio controls.

It is contemplated that a single ear, may be used, for example, for controlling audio functions. A second ear may also be included either as a control element that may be deactivated or a decorative element. It is also contemplated that a single eye, may be used for example, for controlling video functions. A second eye may also be included either as a control element that may be deactivated or a decorative element.

The devices to be controlled by the embodiments of man-machine interfaces described herein may vary. For example, video systems may be controlled, such as televisions, cable or satellite set top boxes, converter devices (e.g., broadcast down-conversion devices conversion boxes (e.g., to convert broadcast high definition television (HDTV) to standard definition (SD) television), DVD players and/or recorders (including upconversion devices), digital video recorder system, video cassette players and/or recorders, automotive/marine video systems, airplane video systems, video game systems, security or safety monitoring system (e.g., for monitoring a home security camera or for monitoring a camera set to view an individual being cared for), video-conferencing system. Audio systems may be controlled, such as home audio systems, mini audio systems, portable audio systems, automotive/marine audio systems, computer audio systems, or airplane audio systems. Further devices that may be controlled include but are not limited to computer systems, appliances, and video display devices embedded within other appliances.

Control elements provided herein having intuitive shapes and/or positions described above as associated with the man-machine interfaces may also be provided integral with various devices. For example, personal electronic devices such as portable disc players, portable media (audio and/or video) players, and portable radios will benefit from control elements having intuitive shapes and/or positions associated with the function. Personal care devices such as electric toothbrushes and electric razors will benefit from control elements having intuitive shapes and/or positions associated with the function. Personal healthcare devices such as blood pressure and glucose monitors will benefit from control elements having intuitive shapes and/or positions associated with the function. Communications devices such as telephonic communication devices and other electronic communications devices such as web content devices will also benefit from control elements having intuitive shapes and/or positions associated with the function. Personal comfort devices such as lift beds and lift chairs may also benefit from control elements having intuitive shapes and/or positions associated with the function as described herein. The below described examples are not intended to be limiting, but rather set forth various configurations and applications of the control elements taught herein.

Figure 5A:
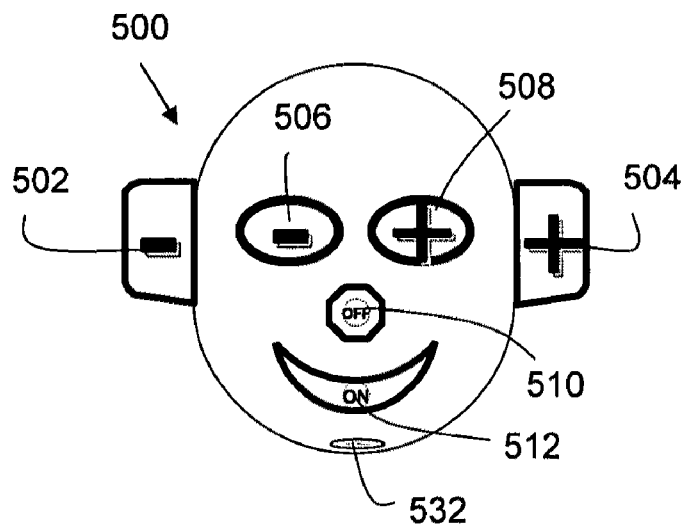
FIG. 5A shows a top view of an example of an audio device according to certain embodiments of the present invention.
Figure 5B:
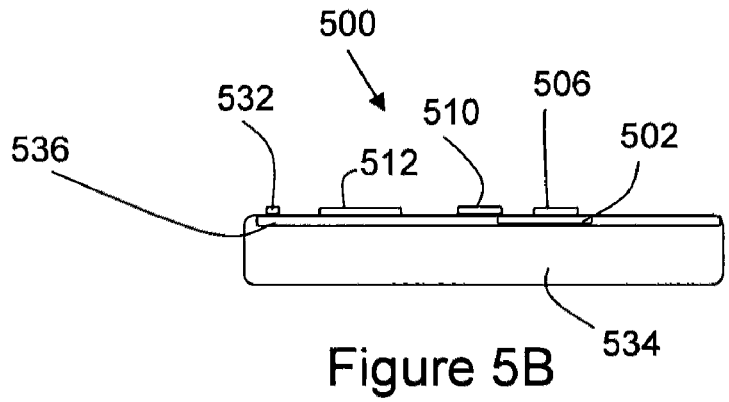
FIG. 5B shows a side view of the example shown in FIG. 5A in the closed position.
Figure 5C:
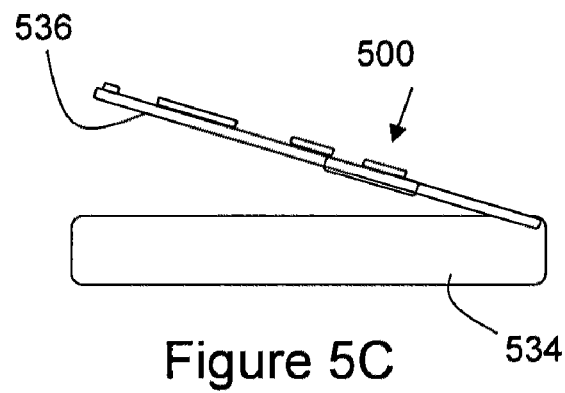
FIG. 5C shows a side view of the example shown in FIG. 5A in the open position.

For example, and referring now to FIGS. 5A-5C, a portable disc player, such as a portable CD player 500 is shown. The player 500 includes a conventional base 534 and associated cover 536. Features of the player such as power supplies and/or recharging interfaces, electronic circuitry, speakers, microphones, output jacks such as headphone outputs and other interfaces, battery cover elements, media slots; carrying straps, and/or other features found on conventional CD players may be provided. One or more various control elements according to aspects of the present invention are provided to control operation of the device. For example, control elements 502, 504 in the position of and configuration of ears of an animate being may be used to control the volume; control elements 506, 508 in the position of and configuration of eyes of an animate being may control functions such as track selection and/or track scanning; control element 510 in the position of a nose of an animate being and in the configuration of an octagonal "stop" sign symbol may be used to stop a track and/or control power functions such as shutting the device off; and control element 512 in the position of and configuration of a mouth of an animate being may be used to start a track and/or control power functions such as turning the device on. Further, a mechanical or electro-mechanical switch element 532 in the position of and configuration of a chin of an animate being may be used to open the cover 536.

Figure 6:
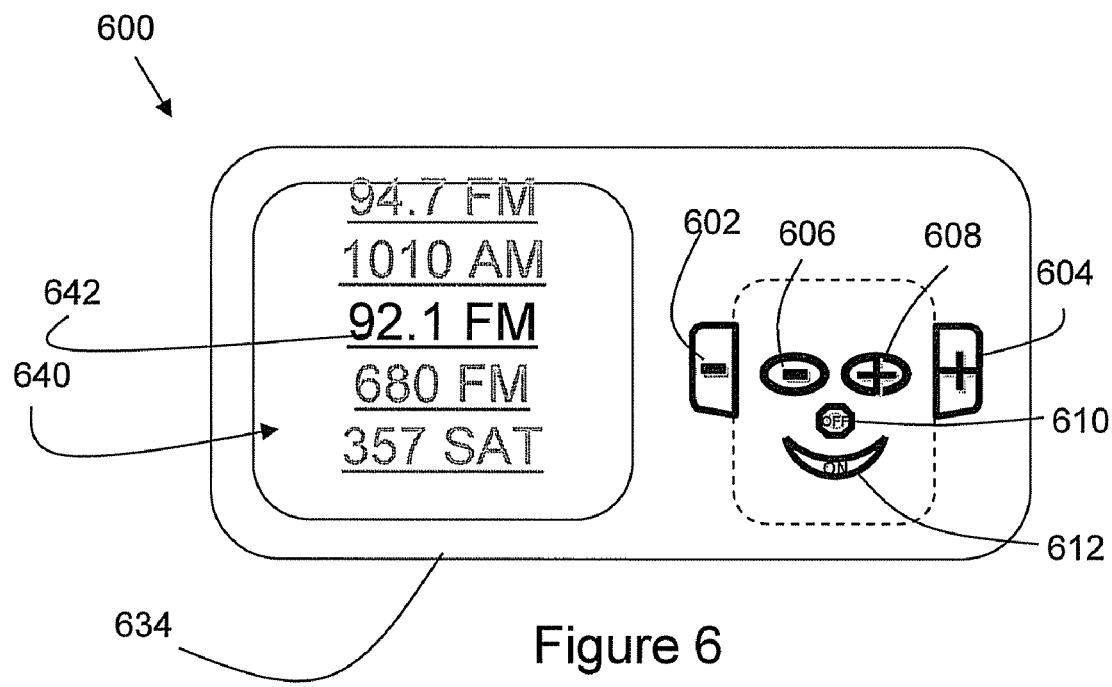
FIG. 6 shows a top view of another example of an audio device according to certain embodiments of the present invention.

Referring now to FIG. 6, a portable tuner device, such as a portable radio 600 is shown. The portable radio 600 includes a conventional body 634 and optionally accommodating a suitable display 640, for example, for displaying a selected tuner frequency 642. In certain embodiments, the radio 600 is capable of being preprogrammed to allow a user to easily scroll through selected frequencies using the control elements provided herein. Features of the radio such as power supplies and/or recharging interfaces, electronic circuitry, speakers, microphones, output jacks such as headphone outputs and other interfaces, antennae, battery cover elements, media slots; carrying straps, and/or other features found on conventional AM/FM/TV/WEATHER radios and as well as satellite radio tuners may be provided. One or more various control elements according to aspects of the present invention are provided to control operation of the device. For example, control elements 602, 604 in the position of and configuration of ears of an animate being may be used to control the volume; control elements 606, 608 in the position of and configuration of eyes of an animate being may control functions such as scanning through tuner stations and selecting preset tuner frequencies; control element 610 in the position of a nose of an animate being and in the configuration of an octagonal "stop" sign symbol may be used to mute the device and/or control power functions such as shutting the device off; and control element 612 in the position of and configuration of a mouth of an animate being may be used to return to listening mode (un-mute) and/or control power functions such as turning the device on. Note that the display 640 is optional, wherein frequencies or stations are preset by a user, parent, guardian or caregiver, allowing a user to scroll through with suitable control elements, e.g., control elements 606, 608 in the position of and configuration of eyes of an animate being.

Figure 7:
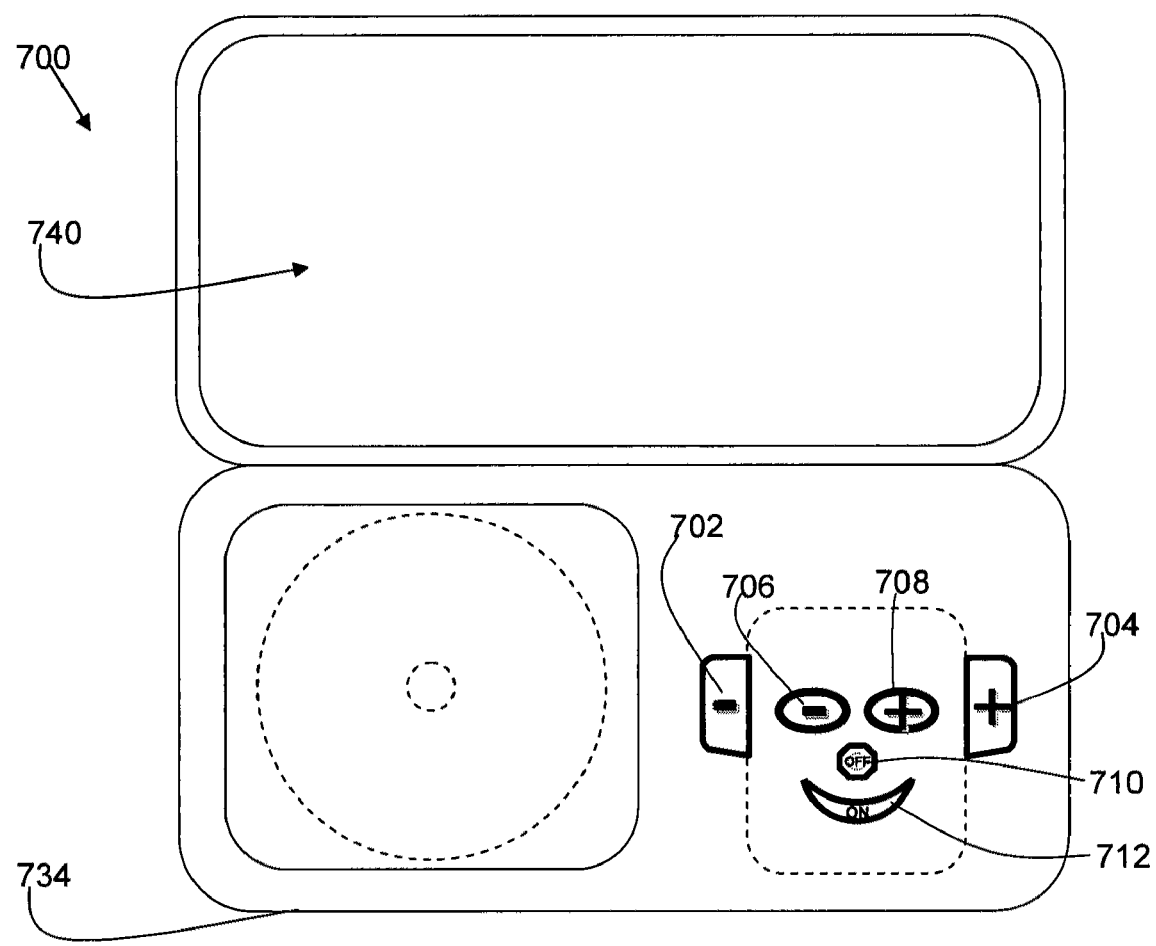
FIG. 7 shows a portable video player according to certain embodiments of the present invention.

Referring now to FIG. 7, a portable disc player with a video display, e.g., liquid crystal display (LCD) or organic light emitting diode (OLED) suitable for portable devices, such as a portable DVD player 700 is shown. The player 700 includes a conventional base 734 and associated display 740 (e.g., LCD or OLED), for example, foldable about the base 734 as is conventionally known. Features of the player such as power supplies and/or recharging interfaces, electronic circuitry, speakers, microphones, output jacks such as headphone outputs and other interfaces, battery cover elements, media slots; carrying straps, and/or other features found on conventional portable video players may be provided. One or more various control elements according to aspects of the present invention are provided to control operation of the device. For example, control elements 702, 704 in the position of and configuration of ears of an animate being may be used to control the volume; control elements 706, 708 in the position of and configuration of eyes of an animate being may control functions such as track selection and/or track scanning; control element 710 in the position of a nose of an animate being and in the configuration of an octagonal "stop" sign symbol may be used to stop a track and/or control power functions such as shutting the device off; and control element 712 in the position of and configuration of a mouth of an animate being may be used to start a track and/or control power functions such as turning the device on.

Figure 8:
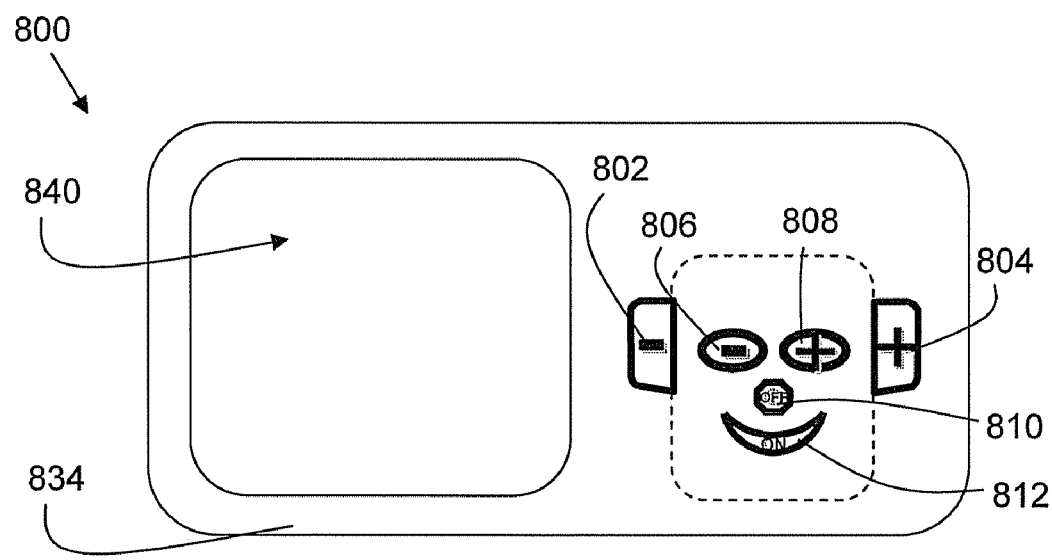
FIG. 8 shows another embodiment of a video player according to certain embodiments of the present invention.

Referring now to FIG. 8, a portable device such as a personal audio and/or video player, personal digital assistant, portable computer, portable video and/or audio monitor, or other portable device 800 is shown. The device 800 includes a conventional body 834 and associated display 840 (e.g., LCD or OLED), for example, built into the body 834 as is conventionally known. Features of the device such as power supplies and/or recharging interfaces, electronic circuitry, internal media storage (e.g, flash memory or built in magnetic hard drive), speakers, microphones, camera devices and circuitry (e.g., for video telephony, or for camera functionality on a monitor device, for example, serving as an in-home monitor for monitoring by a parent, guardian or caretaker), output jacks such as headphone outputs and other interfaces, wireless input/output circuitry and associated antennae, battery cover elements, media slots; carrying straps, and/or other features found on conventional portable devices may be provided. One or more various control elements according to aspects of the present invention are provided to control operation of the device. For example, control elements 802, 804 in the position of and configuration of ears of an animate being may be used to control the volume; control elements 806, 808 in the position of and configuration of eyes of an animate being may control functions such as track selection and/or track scanning; control element 810 in the position of a nose of an animate being and in the configuration of an octagonal "stop" sign symbol may be used to stop a track and/or control power functions such as shutting the device off; and control element 812 in the position of and configuration of a mouth of an animate being may be used to start a track and/or control power functions such as turning the device on. The device 800 may interface with various networks by a wired interface (e.g., a Universal serial bus, serial port connection, parallel port connection, IEEE 1394 connection (Firewire or iLink), ethernet connection) or wireless interface (e.g., wireless local area network, wireless broadband network, Bluetooth, cellular digital packet technology, wireless metropolitan networks, or other wireless connectivity)

As generally shown in FIGS. 9A, 9B, 10A, 10B, and 11, control elements according to certain embodiments of the present invention are well suited for telephonic devices. These telephonic devices may include audio telephonic devices and/or video telephonic devices. Further, these telephonic devices may operate on various types of telephonic networks including but not limited to plain old telephone service (POTS), digital subscriber line (DSL), asymmetric digital subscriber line (ADSL), Voice over Internet Protocol (VoIP) (including but not limited to those wherein the Internet Protocol source is T-carrier lines (e.g., North America), E-carrier lines (e.g., European), DSL, ADSL, POTS, cable networks, cellular and/or satellite networks), cellular, and/or satellite. The various telephonic systems described herein may be wired or wireless. The various telephonic systems described herein may also be used to navigate certain Interactive Voice Response (IVR) systems, which are well known to be extremely cumbersome and frustrating to the average individual, thus are an extreme burden and oftentimes impossibility for certain individuals, including young children, elderly, those with severe arthritic or other physically debilitating conditions, or those with Alzheimer's disease, dementia, or other mentally debilitating conditions.

Figure 9A:
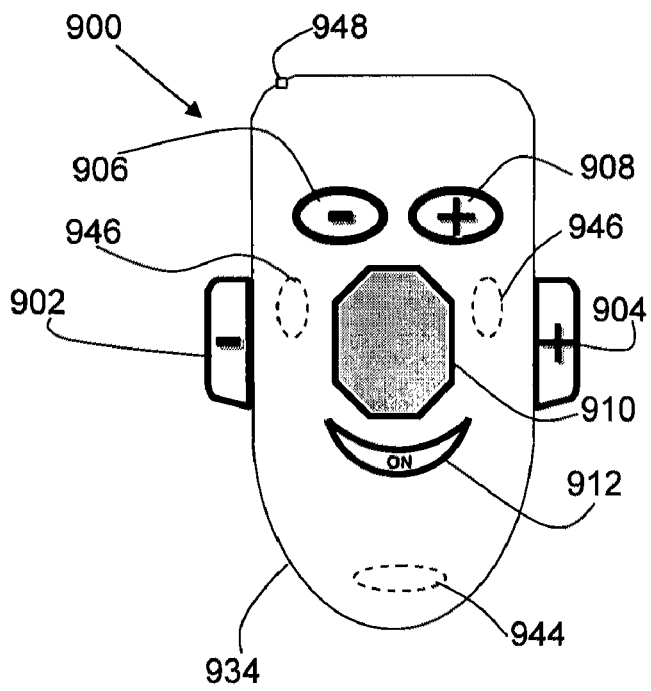
FIGS. 9A and 9B show front and side views, respectively, of a telephone according to certain embodiments of the present invention.
Figure 9B:
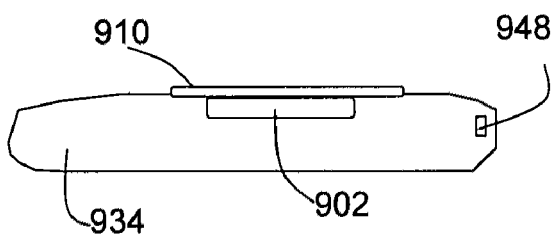

Referring now to FIGS. 9A and 9B a telephonic device such as a mobile or wireless telephone 900 is shown. The 900 includes a body 934. Features of the telephonic device such as power supplies and recharging interfaces, electronic circuitry, internal media storage (e.g, flash memory), speakers, microphones, output jacks such as headphone outputs and other interfaces, speakerphone functionality, camera devices and circuitry (e.g., for video telephony, or for camera functionality on a telephonic device), wireless input/output circuitry and associated antennae, battery cover elements, media slots; carrying straps, and/or other features found on conventional telephones may be provided. One or more various control elements according to aspects of the present invention are provided to control operation of the device. For example, control elements 902, 904 in the position of and configuration of ears of an animate being may be used to control the volume; control elements 906, 908 in the position of and configuration of eyes of an animate being may control functions such as scrolling through stored telephone numbers or images associated with certain telephone numbers, such as images of emergency symbols, images of family, caregivers and friends, images of doctors, and the like; control element 910 in the position of a nose of an animate being and in the configuration of an octagonal "stop" sign symbol may includes a video display for displaying the above mentioned images or numbers and/or to select an image or number (e.g., "stop" when a desired image is displayed) by touch screen functionality or other depressible element (e.g., the ring of the octagon shape configured to be depressed whereas a display is positioned within the octagon shape); and control element 912 in the position of and configuration of a mouth of an animate being may be used as a "call" button similar to existing phones to send a call to a selected party and/or control power functions such as turning the phone on. It may be desirable in certain embodiments of telephonic devices to provide a suitable backlight or other illumination so the control element 912 flashes while a call is incoming, for instance. Further, a speaker device 946 is provided, for example, at the positions of cheeks of an animate being, and a microphone device 944 is provided, for example, at the location of a chin of an animate being.

Figure 9C:
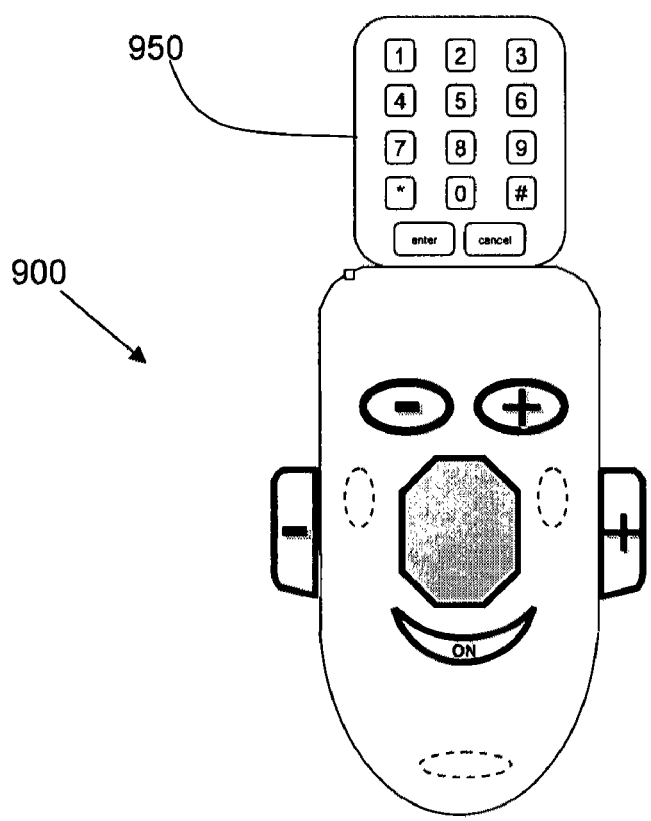
FIG. 9C shows a front view of another telephone according to certain embodiments of the present invention.

In an further embodiment, and referring now to FIG. 9C, an example of an interface 950 is provided, for example, in the form of a keypad that is configured and dimensioned to slide within a portion of the phone 900. The interface 950 may be used to program in certain contacts and other information to allow a user to use the phone 900 without the need for traditional keypads or the like to input the number of party to be called. Rather, a parent, guardian or caregiver may input this information. The interface 950 may be secured within a portion of the phone 900, for example, with a tamper resistant structure or other locking device such as one or more screws. Note this interface 950 may also be used in other telephonic devices 1000 and 1100 described further herein.

Figure 10A:
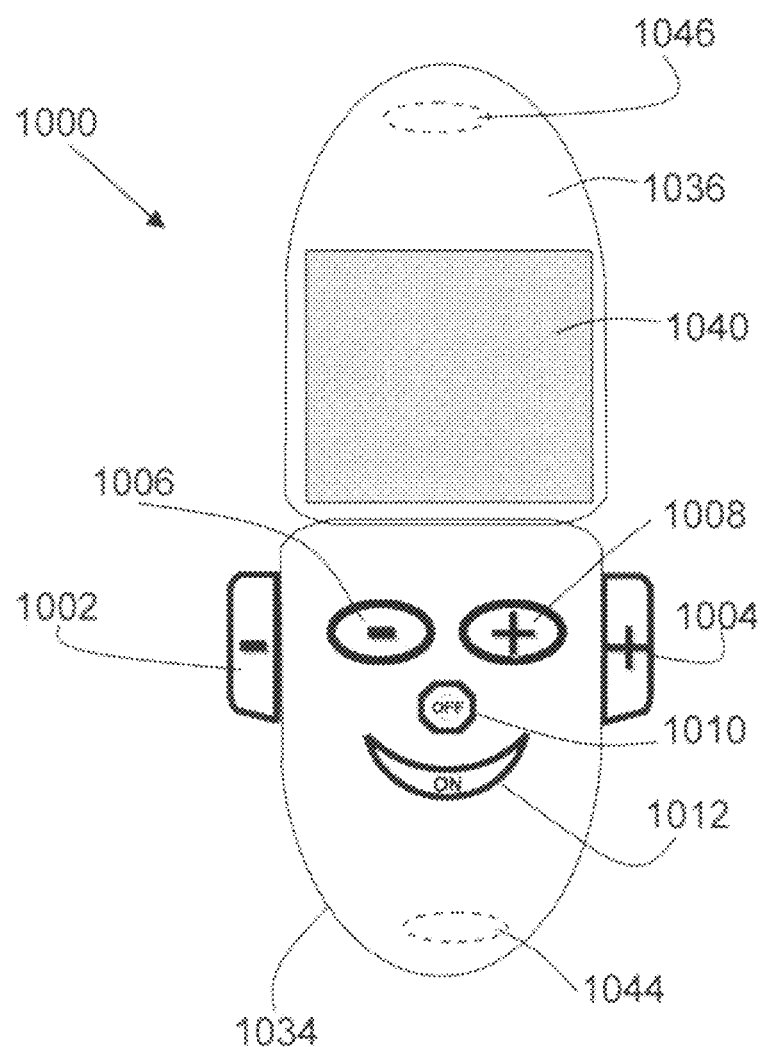
FIG. 10A shows a front view of a telephone in an open state according to certain embodiments of the present invention.
Figure 10B:
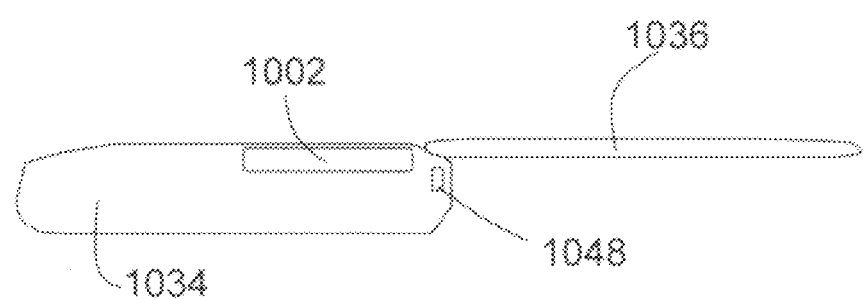
FIG. 10B shows a side view of a telephone according FIG. 10A.
Figure 11:
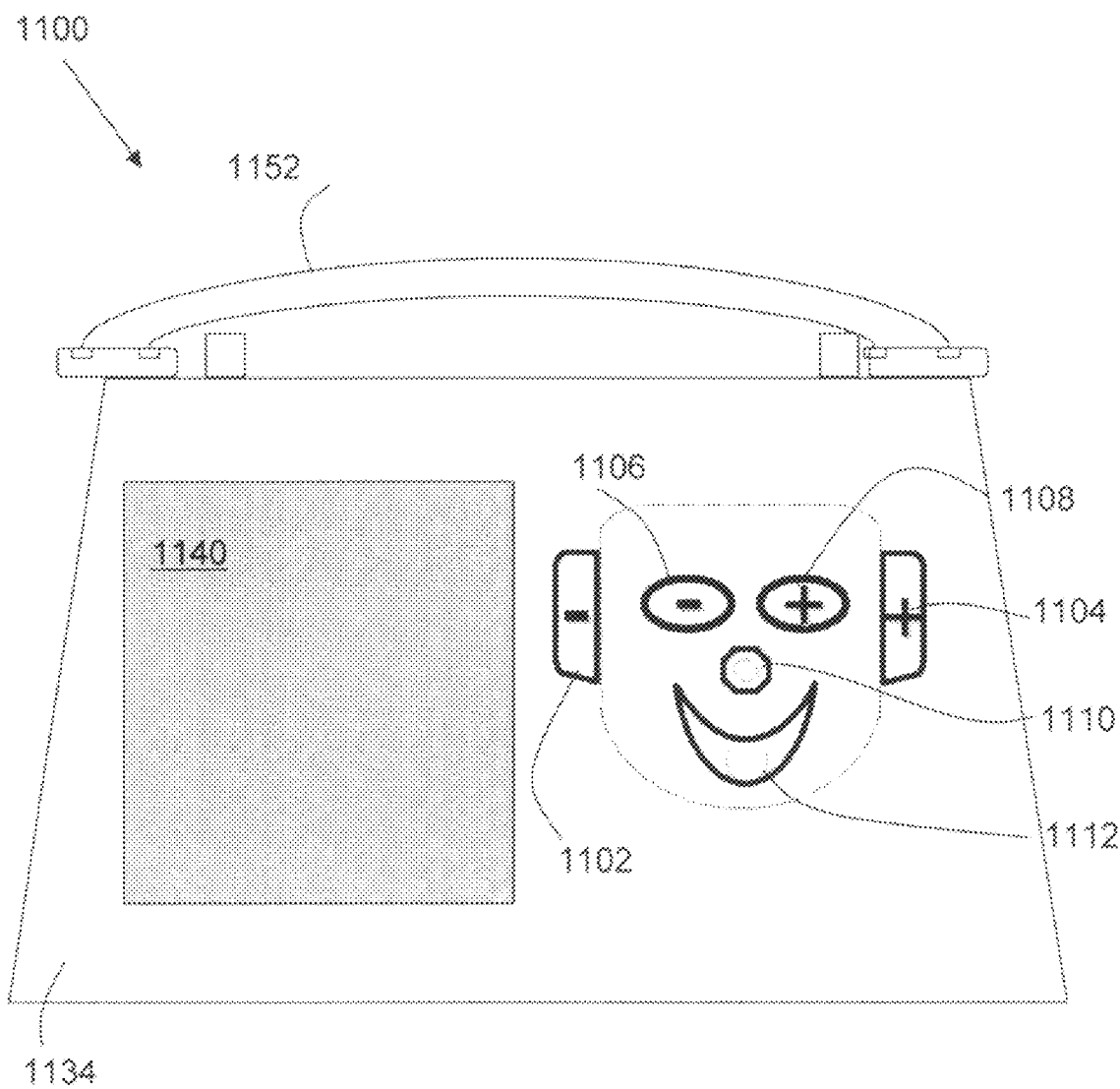
FIG. 11 shows a front view of another telephone according to certain embodiments of the present invention.

Referring now to FIGS. 10A and 10B a telephonic device such as a mobile or wireless telephone 1000 is shown similar to that shown in FIGS. 9A and 9B, except that a display 1040 (e.g., LCD or OLED) is provided on a foldable body portion 1036 foldably or slidably attached to includes a body 1034 rather than within the control element 1010 positioned in the location of a nose of an animate being and configured as the configuration of an octagonal "stop" sign symbol. Features of the telephonic device such as power supplies and recharging interfaces, electronic circuitry, internal media storage (e.g., flash memory), speakers, microphones, output jacks such as headphone outputs and other interfaces, speakerphone functionality, camera devices and circuitry (e.g., for video telephony, or for camera functionality on a telephonic device), wireless input/output circuitry and associated antennae, battery cover elements, media slots; carrying straps, and/or other features found on conventional telephones may be provided. One or more various control elements according to aspects of the present invention are provided to control operation of the device. For example, control elements 1002, 1004 in the position of and configuration of ears of an animate being may be used to control the volume; control elements 1006, 1008 in the position of and configuration of eyes of an animate being may control functions such as scrolling through stored telephone numbers or images associated with certain telephone numbers, such as images of emergency symbols, images of family, caregivers and friends, images of doctors, and the like, that are displayed on display 1140; control element 1010 in the position of a nose of an animate being and in the configuration of an octagonal "stop" sign symbol may be used to select an image or number (e.g., "stop" when a desired image is displayed) and/or control power functions such as shutting the phone off; and control element 1012 in the position of and configuration of a mouth of an animate being may be used as a "call" button similar to existing phones to send a call to a selected party and/or control power functions such as turning the phone on. Further, a speaker device 1046 is provided, for example, on body portion 1036, and a microphone device 1044 is provided, for example, at the location of a chin of an animate being.

Referring now to FIGS. 11A and 11B a telephonic device such as conventional style telephone 1100 is shown having a base 1134 with an associated handset 1152 (wired or wireless) having a microphone and speaker. Features of the telephonic device such as power supplies, electronic circuitry, internal media storage (e.g, flash memory or built in magnetic hard drive), speakers, microphones, output jacks such as headphone outputs and other interfaces, speakerphone functionality, camera devices and circuitry (e.g., for video telephony, or for camera functionality on a telephonic device), other input interfaces, wireless input/output circuitry and associated antennae, battery cover elements, media slots; carrying straps, and/or other features found on conventional telephones may be provided. One or more various control elements according to aspects of the present invention are provided to control operation of the device. For example, control elements 1102, 1104 in the position of and configuration of ears of an animate being may be used to control the volume; control elements 1106, 1108 in the position of and configuration of eyes of an animate being may control functions such as scrolling through stored telephone numbers or images associated with certain telephone numbers, such as images of emergency symbols, images of family, caregivers and friends, images of doctors, and the like, that are displayed on display 1140 (e.g., LCD, OLED, CRT, projection-based, plasma); control element 1110 in the position of a nose of an animate being and in the configuration of an octagonal "stop" sign symbol may be used to select an image or number (e.g., "stop" when a desired image is displayed) and/or control power functions such as shutting the phone off, or hanging the phone up; and control element 1112 in the position of and configuration of a mouth of an animate being may be used as a "call" button similar to existing phones to send a call to a selected party and/or control power functions such as turning the phone on.

Referring now to FIG. 12, a control device 1200 such as a light switch conventional lighting sources is shown. The device 1200 includes a body 1234 including associated circuitry and hardware to replace existing light switch devices. One or more various control elements according to aspects of the present invention are provided to control operation of the device. For example, control elements 1206, 1208 in the position of and configuration of eyes of an animate being may control functions such as reducing light intensity (1206) and increasing light intensity (1208), or changing light color; control element 1210 in the position of a nose of an animate being and in the configuration of an octagonal "stop" sign symbol may be used to shut off the light; and control element 1212 in the position of and configuration of a mouth of an animate being may be used to turn on the light.

Referring now to FIGS. 13A-C, a control element 1388 is provided that slides or switches from a first position indicated in FIG. 13A for full light intensity, a second to a second position indicated in FIG. 13B for medium intensity, to an "off" position indicated in FIG. 13C, or optionally any position therebetween.

Figure 14:
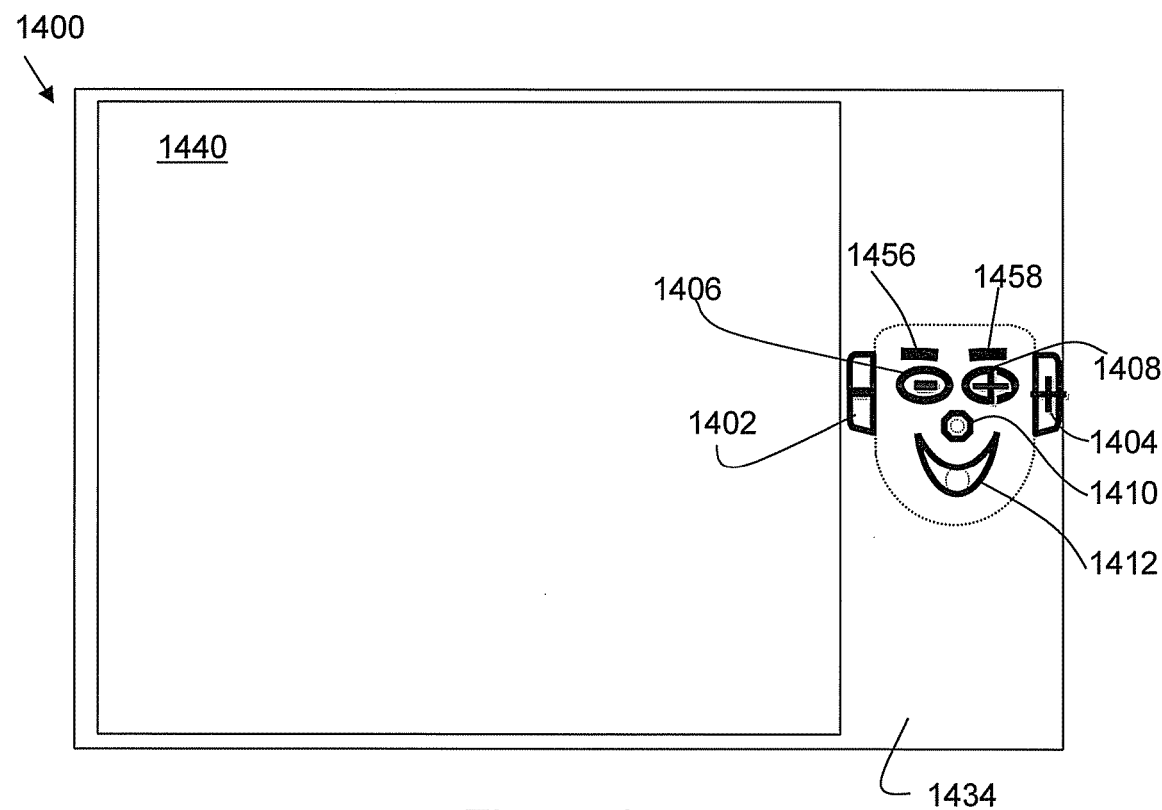
FIG. 14 shows a computer monitor according to certain embodiments of the present invention.

Referring now to FIG. 14, a display device 1400 is shown. The display device 1400 includes a body 1434 and a display area 1440 (e.g., LCD, OLED, CRT, projection-based, plasma). Features of the device such as power supplies and recharging interfaces, input interfaces, electronic circuitry, speakers, microphones, output jacks such as headphone outputs and other interfaces, camera devices and circuitry (e.g., for video telephony, or for camera functionality on a monitor device, for example, serving as an in-home monitor for monitoring by a parent, guardian or caretaker), wireless input/output circuitry and associated antennae, battery cover elements, media slots; carrying straps, and/or other features suitable for display devices may be provided. One or more various control elements according to aspects of the present invention are provided to control operation of the device. For example, control elements 1402, 1404 in the position of and configuration of ears of an animate being may be used to control the volume; control elements 1406, 1408 in the position of and configuration of eyes of an animate being may control functions such as scanning up or down, for example, within a document, image or web page, scanning through a series of documents, images or web pages, enlarging/decreasing the typeface of text materials, and/or zooming in and out of images (note depressing combinations of control elements 1406, 1408 and other control elements may be used to toggle between these various functions, or only one function may be designated); optional control elements 1456, 1458 in the position of and configuration of eyebrows of an animate being may be used to control certain functions described with respect to control elements 1406, 1408, control element 1410 in the position of a nose of an animate being and in the configuration of an octagonal "stop" sign symbol may be used to stop scanning through documents, images or web pages and/or control power functions such as shutting the display device off; and control element 1412 in the position of and configuration of a mouth of an animate being may be used to mute/unmute the device and/or control power functions such as turning the display device on. The display device may be used for various features, such as a television, a computer monitor, an in-home monitoring component (e.g., where the device 1400 includes a suitable camera element and interconnectivity with an associated device) video player (e.g., where the device 1400 includes suitable media sources including but not limited to internal storage (e.g., magnetic and/or flash memory) discs, cassettes, media cards or sticks, or suitable interconnectivity with media sources such as satellite network devices, cable network devices, and intranet or Internet devices). In further embodiments, suitable software is provided for use with device 1400 having features therein that are programmed to interact with one or more of the control elements 1402, 1404, 1406, 1408, 1456, 1458, 1410 and 1412.

Figure 15:
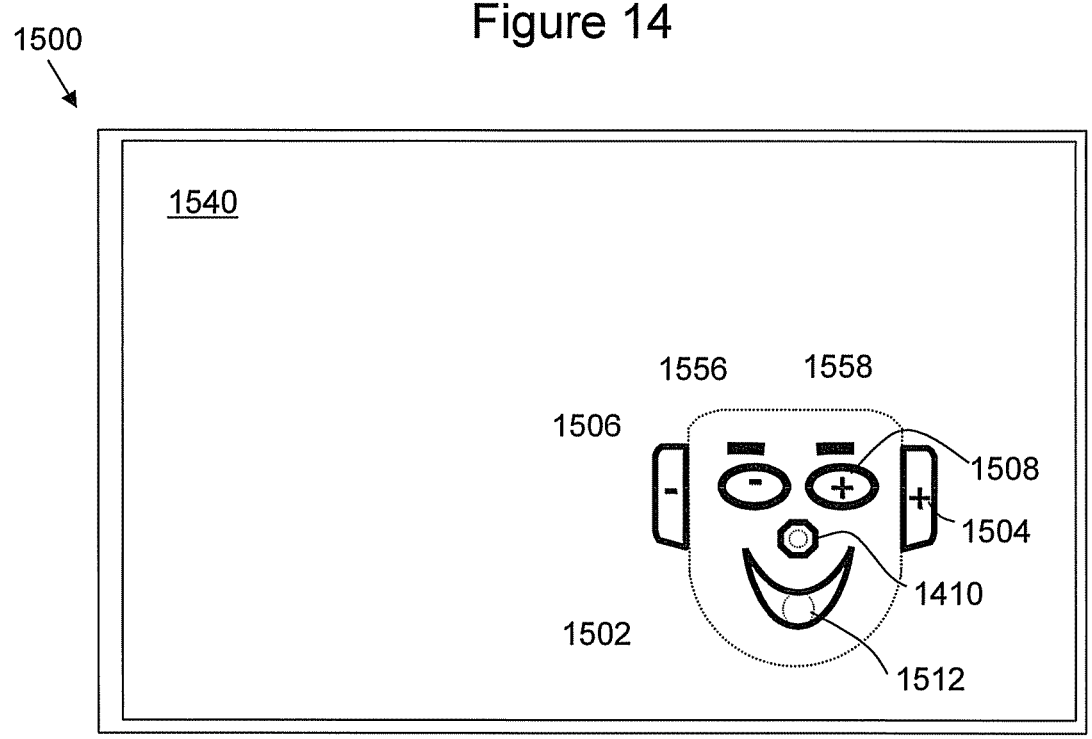
FIG. 15 shows another example of a computer monitor according to certain embodiments of the present invention.

Referring now to FIG. 15, a display device 1500 is shown. The functionality of the device may be similar to device 1400 described above, except that the control elements may be displayed on a display area 1540 and operate as touch screen controls or a type of virtual control element.

Figure 16:
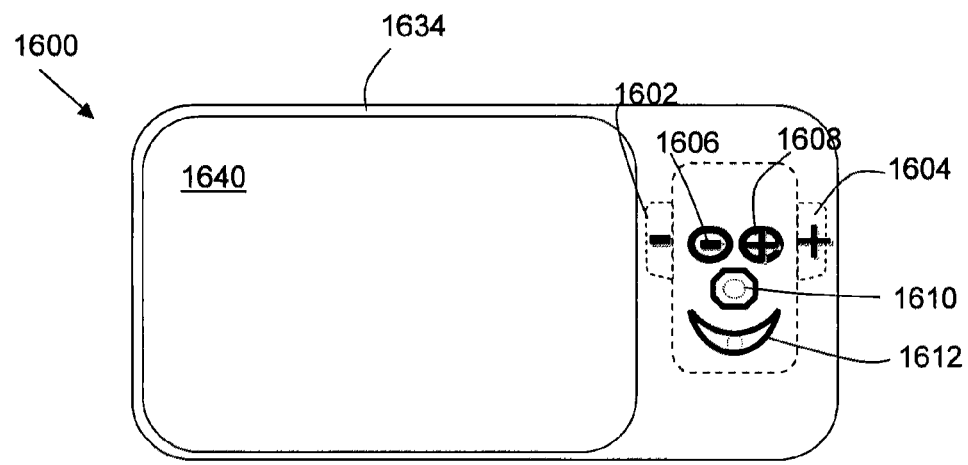
FIG. 16 shows a picture frame device according to certain embodiments of the present invention.

Referring now to FIG. 16, a picture frame device 1600 is shown. Picture frame device 1600 includes a body 1634 and a display area 1640. Display area 1640 may be in the form of a mechanical structure for holding one or more pictures, for example, in a scrolling structure. Alternatively, or in combination, display area 1640 may include an electronic controlled display (e.g., LCD, OLED, CRT, projection-based, plasma) for displaying still images or video content, for example, loaded within an on-board memory source, provided through external media, or provided through an external media source with a suitable interface. Features of the device such as power supplies and recharging interfaces, electronic circuitry, speakers, microphones, output jacks such as headphone outputs and other interfaces, camera devices and circuitry (e.g., for video telephony, or for camera functionality on a monitor device, for example, serving as an in-home monitor for monitoring by a parent, guardian or caretaker), suitable media sources including but not limited to internal storage (e.g., magnetic and/or flash memory) discs, cassettes, media cards or sticks, wireless input/output circuitry and associated antennae, other input interfaces, battery cover elements, media slots; carrying straps, and/or other features suitable for picture frame devices may be provided. One or more various control elements according to aspects of the present invention are provided to control operation of the device. For example, control elements 1602, 1604 (optional) in the position of and configuration of ears of an animate being may be used to activate or control the volume of voice greetings or the like, for example, associated with certain pictures; control elements 1606, 1608 in the position of and configuration of eyes of an animate being may control functions such as scanning up or down, for example, through a series of images or pictures, scanning forward through video content, and/or zooming in and out of images; control element 1610 in the position of a nose of an animate being and in the configuration of an octagonal "stop" sign symbol may be used to stop scanning through pictures and/or control power functions such as shutting the display device off; and control element 1612 in the position of and configuration of a mouth of an animate being may be used to mute/unmute the device and/or control power functions such as turning the display device on.). In further embodiments, suitable software is provided for use with device 1600 having features therein that are programmed to interact with one or more of the control elements 1602, 1604, 1606, 1608, 1610 and 1612.

Figure 17:
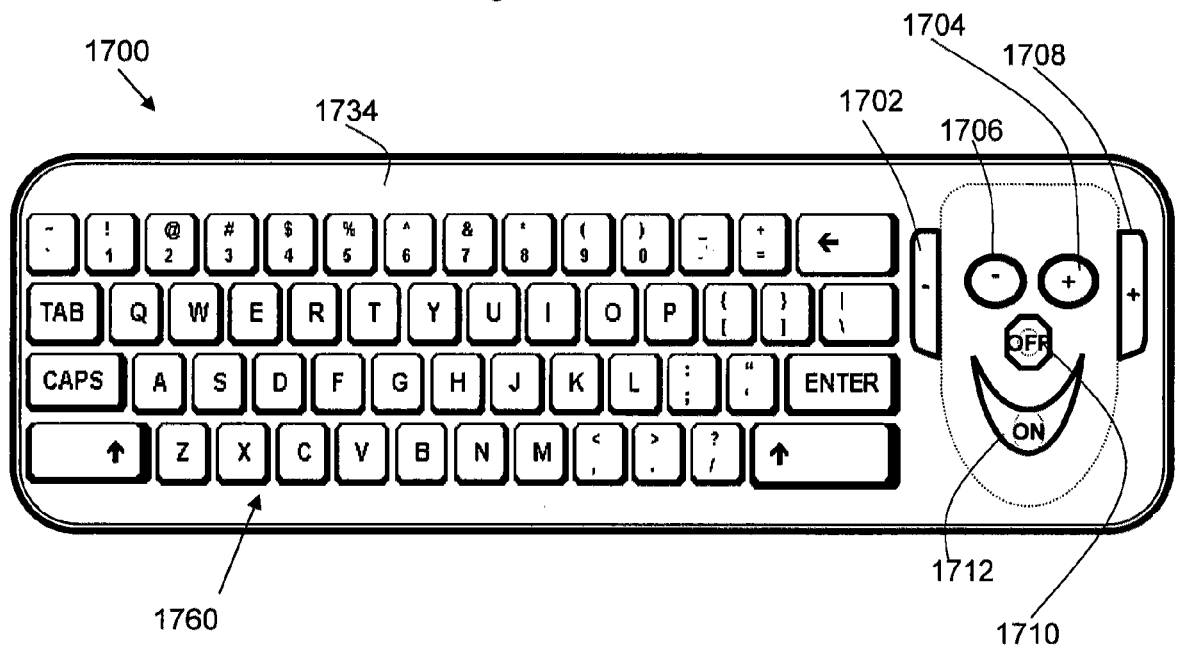
FIG. 17 shows a keyboard device according to certain embodiments of the present invention.

Referring now to FIG. 17, a keyboard device 1700 is shown. Keyboard device 1700 includes a body 1734 and a conventional keyboard region 1760. Keyboard region 1760 may be provided as shown, for example, as a standard QWERTY keyboard, or in another configuration suitable for the intended user. For example, for young children learning the alphabet, or for those with little or no experience or debilitated abilities preventing use of a conventional QWERTY arrangement, alphabetical key arrangement may be desirable. Further, fewer or additional keys for various functions may be provided. Features of the device such as circuitry, speakers, microphones, output jacks such as headphone outputs and other interfaces, camera devices and circuitry (e.g., for video telephony, or for camera functionality on a monitor device, for example, serving as an in-home monitor component for monitoring by a parent, guardian or caretaker), suitable media sources including but not limited to internal storage (e.g., magnetic and/or flash memory) discs, cassettes, media cards or sticks, wireless input/output circuitry and associated antennae, other input interfaces, battery cover elements, media slots; carrying straps, and/or other features suitable for keyboard devices may be provided. One or more various control elements according to aspects of the present invention are provided to control operation of the device. For example, control elements 1702, 1704 (optional) in the position of and configuration of ears of an animate being may be used to activate or control the volume of a device associated with the keyboard such as a computer or television; control elements 1706, 1708 in the position of and configuration of eyes of an animate being may control functions such as scanning up or down, for example, through a series of documents or images, scanning forward through video content, enlarging/decreasing the typeface of text materials, and/or zooming in and out of images; control element 1710 in the position of a nose of an animate being and in the configuration of an octagonal "stop" sign symbol may be used to stop scanning through pictures, provide a "no" response to a text, visual and/or audio prompt, and/or control power functions such as shutting the display device off; and control element 1712 in the position of and configuration of a mouth of an animate being may be used to turn on an associated microphone, mute/unmute the device, provide a "yes" response to a text, visual and/or audio prompt, and/or control power functions such as turning the display device on. In further embodiments, suitable software is provided for use with device 1700 having features therein that are programmed to interact with one or more of the control elements 1702, 1704, 1706, 1708, 1710 and 1712. For example, a service such as a television display Internet and/or email system may benefit from using a keyboard 1700.

Referring now to FIGS. 18A-20, various embodiments of handheld toothbrushes, for example, incorporating one or more battery operated motors to rotation and/or vibrate a brush head are shown. These toothbrushes may be disposable, battery operated, rechargeable, and/or including replaceable heads and may be used on various sized toothbrushes for adults and children. Further, various toothbrushes described herein may incorporate various characters, for example, having facial features that form the control elements. Additionally, various toothbrushes described herein may include an automatic shut-off timer.

FIGS. 18A and 18B show one embodiment of a toothbrush 1800 including a head 1862 and a handle 1864. A face portion 1866 includes a control element 1812 in the position of and configuration of a mouth of an animate being that may be used for turning the toothbrush on, and a control element 1810 in the position of a nose of an animate being and in the configuration of an octagonal "stop" sign symbol for turning the toothbrush off. Optionally, indicators 1806, 1808 may indicate whether the device is on, for example, with a suitable light such as a green LED light.

FIG. 19 shows another embodiment of a toothbrush 1900 including a head 1962 and a handle 1964. A face portion 1966 includes a control element 1912 in the position of and configuration of a mouth of an animate being that may be used for toggling the toothbrush between "on" and "off" states. Further, indicators 1906, 1908 in the configuration of and/or position of eyes of an animate being indicate whether the device is on, for example, with a suitable light such as a green LED light.

FIG. 20 shows another embodiment of a toothbrush 2000 including a head 2062 and a handle 2064. A face portion 2066 includes an indicator 2012 in the position of and configuration of a mouth of an animate being that may, for example, light up when the toothbrush is in the "on" state. Further, control elements 2006, 2008 in the configuration of and/or position of eyes of an animate being may be used to switch the device between the "on" and "off" states.

Referring now to FIGS. 21-26, various embodiments of devices that may be useful to control functions in a healthcare setting or for motorized beds are shown using various control elements according to embodiments of the present invention.

FIG. 21 shows a remote control device 2100, for example, for controlling a television, particularly adapted for use with, for example, hospital environments. For example, as shown, control elements 2102, 2104 are in the configuration of and position of ears, and may be pre-set or programmed to control audio functions such as volume. Also, as shown, control elements 2106, 2108 are in the configuration of and position of eyes, and may be pre-set or programmed to control video functions such as channels, programs or files (e.g., on stored media), or other video functions. Control element 2110 is in the configuration of an octagonal stop sign and in the position of a nose, and may be used to control "off" functions or other pre-set or preprogrammed functions. Control element 2112 is in the configuration of and position of a mouth and may control power "on" functions, or other pre-set or preprogrammed functions. Further, a control element 2170 is provided, for example, in the configuration and position of a nurse's cap, which is suitable as control for a nurse call or other assistance alert.

FIGS. 22A and 22B show a controller device 2200 for controlling operations of a hospital bed. One or more various control elements according to aspects of the present invention are provided to control operation of the device. For example, control elements 2274, 2276 are in the position of a head of an animate being printed or raised on the body 2234 of the device 2200 and are programmed to control lowering and raising of the head or upper body portion of a bed. Control elements 2278, 2280 are in the position of a body of an animate being printed or raised on the body 2234 of the device 2200 and are programmed to control lowering and raising of the entire bed. Control elements 2282, 2284 are in the position of feet or legs of an animate being printed or raised on the body 2234 of the device 2200 and are programmed to control lowering and raising of the feet or lower body portion of the bed. The buttons may be configured on the device as shown in FIG. 22B, wherein the face of the device 2200 includes the control elements separated by gaps, and wherein the control elements are suitably connected to the motor control devices of the bed.

Referring now to FIGS. 23 and 24, devices are shown wherein the control elements for controlling elevation of the head and feet are provided by sliding control elements 2374, 2474, 2382, and 2482. Control elements 2374, 2474 are in the configuration of or include a depiction of a head or a face of an animate being, and slide to control elevation of one's head or upper body. Control elements 2382, 2482 are in the configuration of or include a depiction of a foot of an animate being, and slide to control elevation of one's feet or legs.

Figure 25:
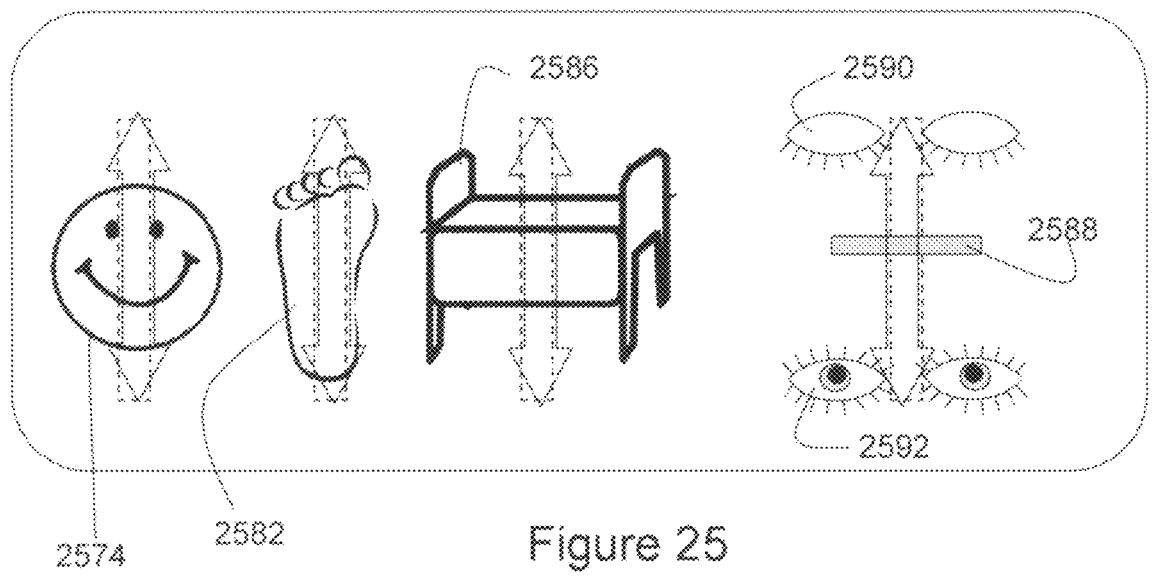
FIG. 25 shows another embodiment of a device for controlling operations of a hospital bed.

Referring now to FIG. 25, a device is shown wherein the control elements for controlling elevation of the head, feet, bed and controlling light intensity are provided by sliding control element 2574 in the form of a head or face, control element 2582 in the form of a foot, control element 2586 in the form of a body, and control element 2588 slidable between a first position 2590 indicating closed eyes for darkness and a second position 2592 indicating open eyes for turning the light on full intensity.

Figure 26:
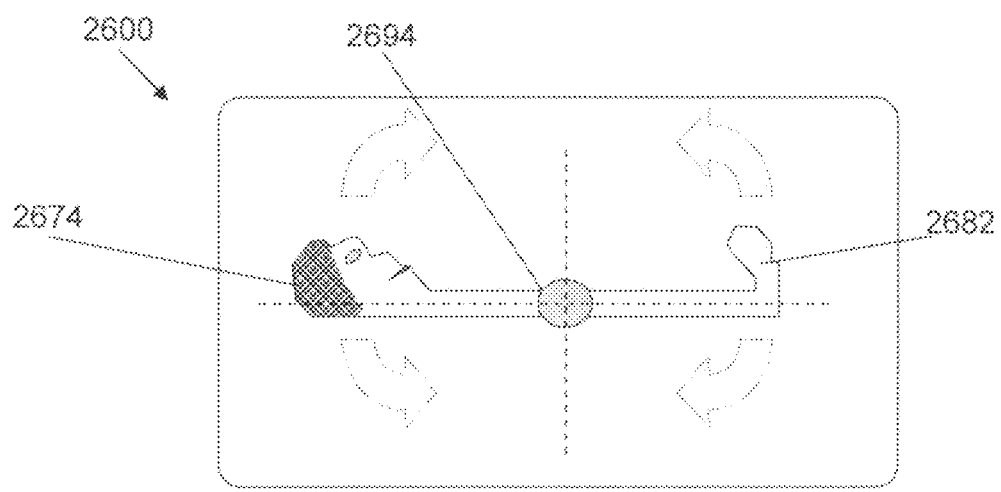
FIG. 26 shows another embodiment of a device for controlling operations of a hospital bed.

Referring now to FIG. 26, a control device 2600 is provided having a body 2634 with a post element 2694 therein. A control element 2674 in the configuration of a head or face of an animate being is provide having one end pivotally attached to post element 2694, wherein rotating the control element elevates or lowers the upper body portion of a motorized bed. Further, a control element 2682 in the configuration of a foot and/or leg of an animate being is provided having one end pivotally attached to post element 2694, wherein rotating the control element elevates or lowers the lower body portion of a motorized bed.

Figure 27:
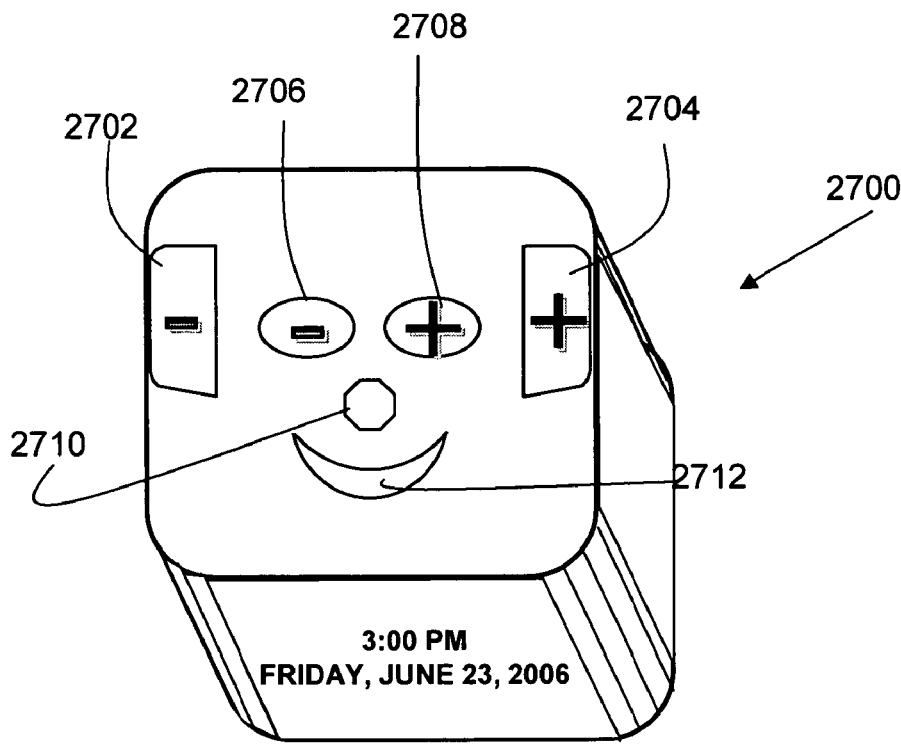
FIG. 27 shows an embodiment of a clock according to certain aspects of the present invention.
Figure 28:
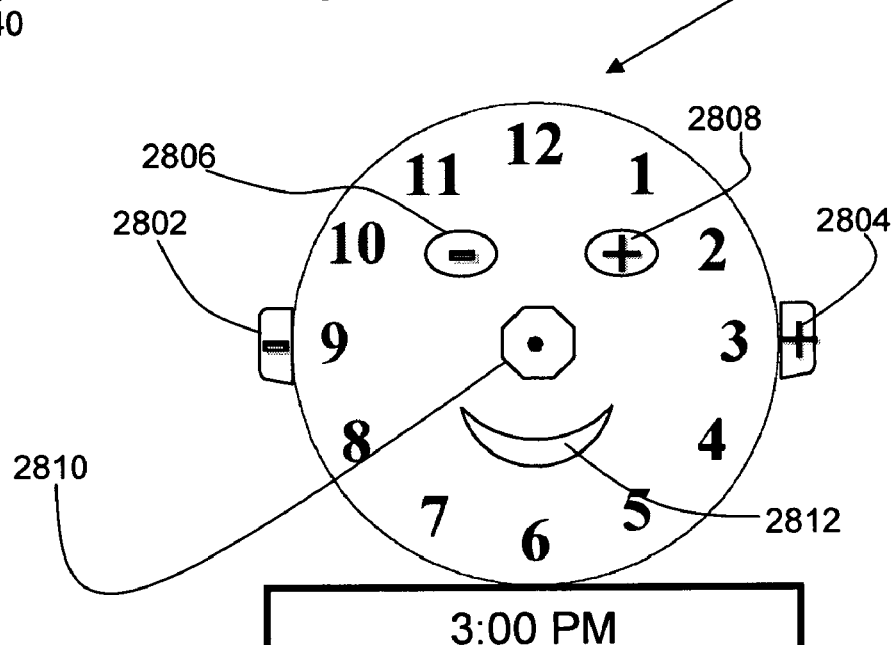
FIG. 28 shows another embodiment of a clock according to certain aspects of the present invention.

Referring now to FIGS. 27 and 28, various embodiments of clocks using control elements according to embodiments of the present invention are shown. Clock 2700 includes a box shaped body, for example, like conventional clock radios and includes various control elements for controlling radio and/or clock functions of the clock 2700. Control elements 2706, 2708 in the configuration of and position corresponding to eyes of an animate being may be used to dim or brighten the clock display 2740 illumination or other integral or separate light fixture. Control elements 2702, 2704 in the configuration of and position corresponding to ears of an animate being may be used to increase or decrease the volume of an alarm or audio function of the clock 2700. A control element 2710 in the configuration of an octagonal stop sign and position corresponding to a nose of an animate being may be used to shut the device off or perform "snooze" functions in an alarm clock. A control element 2712 in the configuration of and position corresponding to a mouth of an animate being may be used to turn on the radio functions of a device, and/or speak the time wherein the clock 27 includes functionality to provide audible time alerts. FIG. 28 shows a similar clock 2800, wherein the control elements 2802, 2804, 2806, 2808, 2810, 2812 are incorporated in a body in the style of a conventional clock face, for example, to allow one with various debilitating conditions to remember that the digital display 2840 represents a time and/or date information.

Figure 29A:
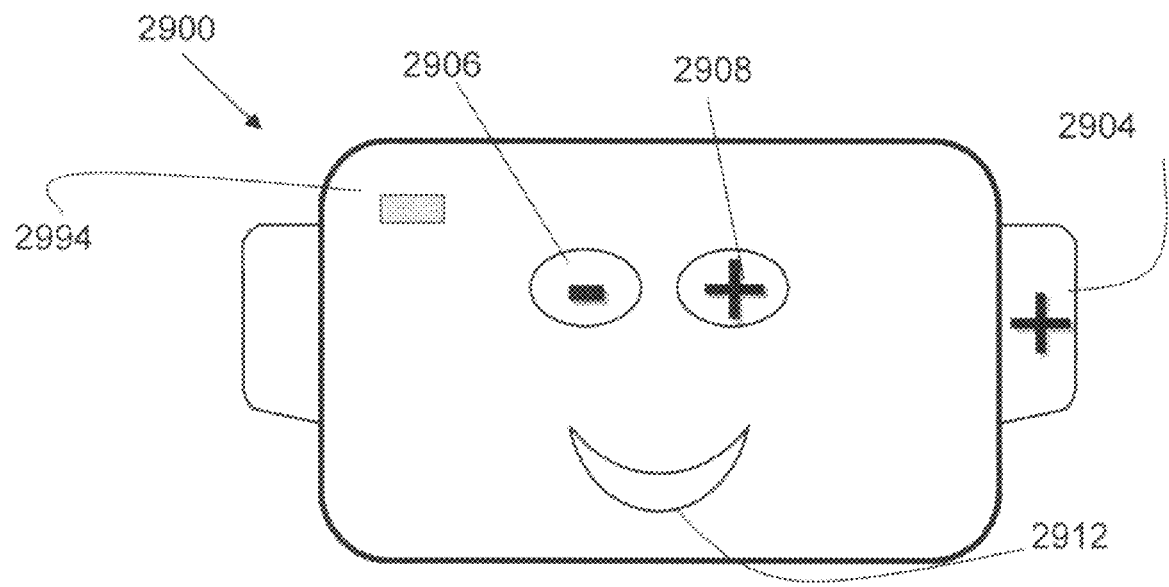
FIGS. 29A and 29B show an embodiment of a camera according to certain aspects of the present invention.
Figure 29B:
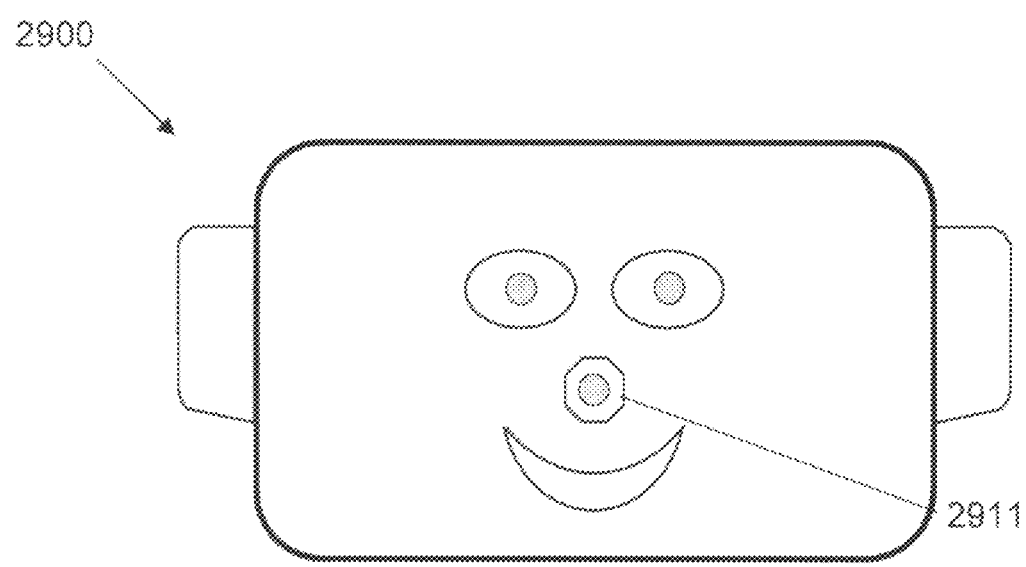

Referring now to FIGS. 29A and 29B, front and back views of a camera device 2900 is provided including control elements according to certain embodiments of the present invention. FIG. 29A depicts a side of the camera 2900 that the user looks at, for example, including a conventional viewfinder 2994. To zoom in and out, control elements 2906, 2908 in the position of and/or configuration of eyes of an animate being are used. Control element 2912 may be used to snap the photograph or digital picture. Control element 2904 may be used to wind film, for example, in conventional film based cameras. Referring to FIG. 29B, the face of the camera that the subject views is depicted. The lens 2911 may be positioned in a location corresponding to the nose of an animate being. The depiction of eyes and a smile are provided, for example, to induce the subject to smile.

Figure 30A:
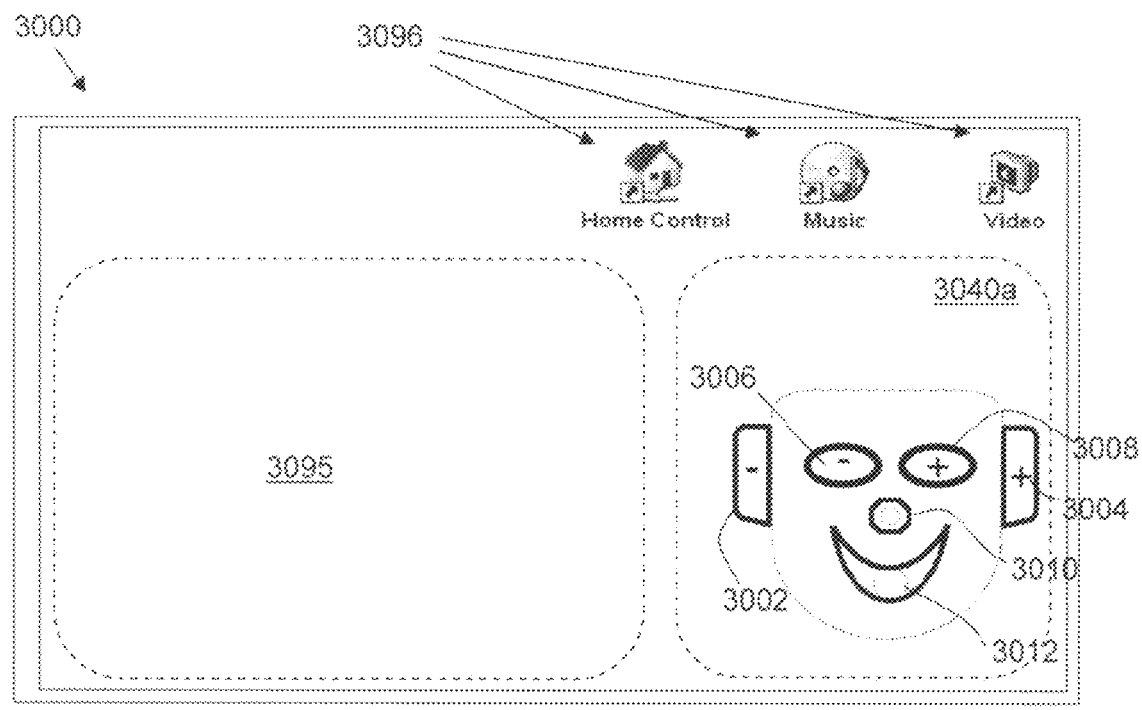
FIGS. 30A and 30B show various modes of a multifunction device.
Figure 30B:
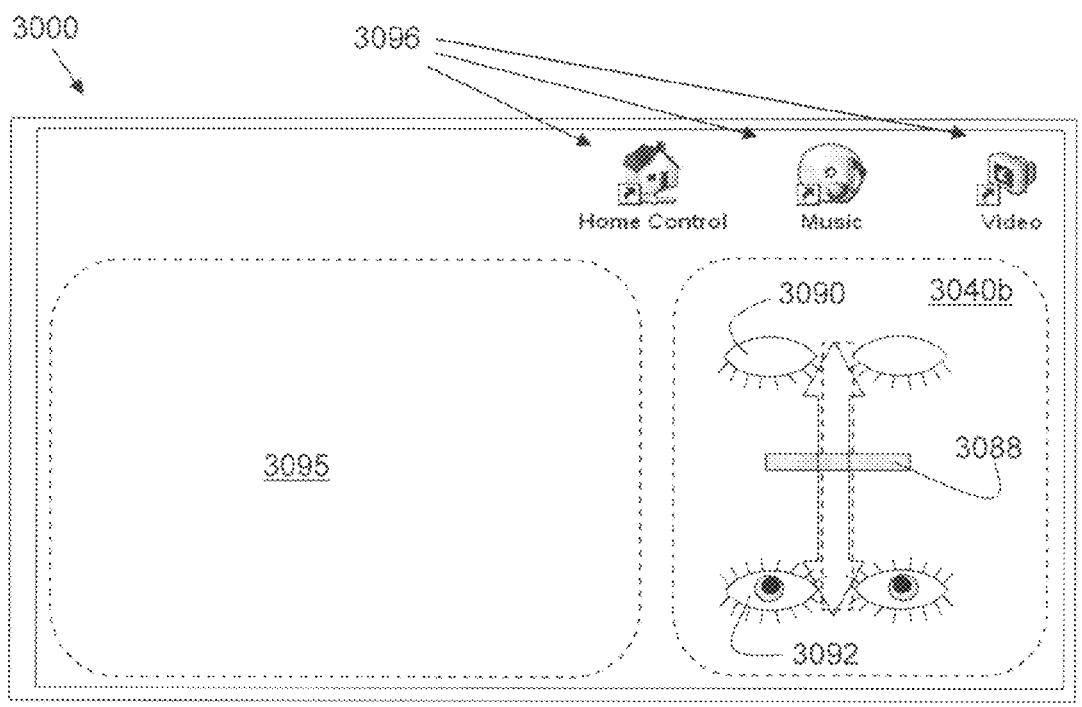
Figure 31:
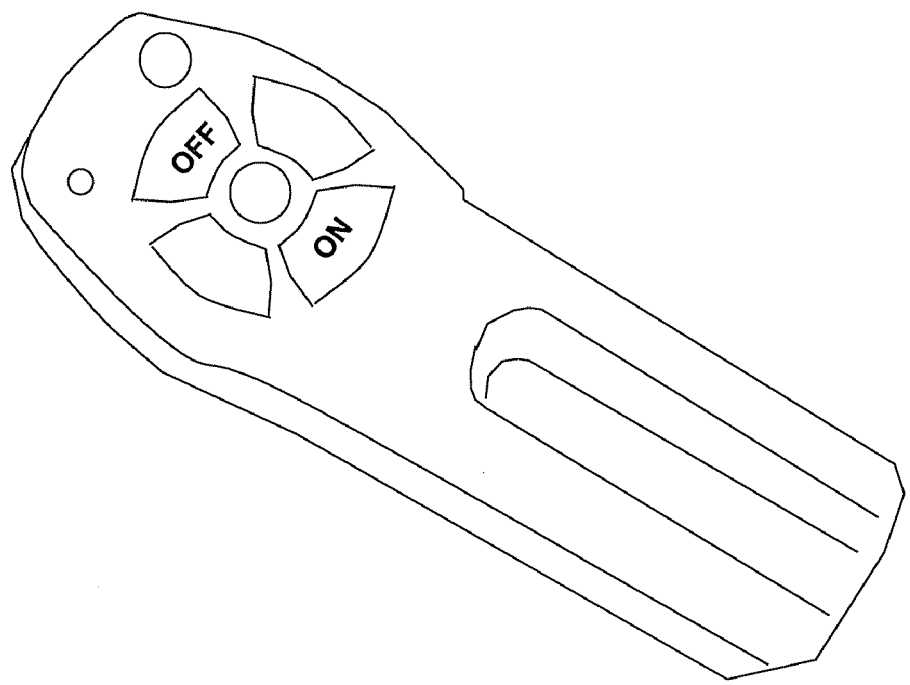
FIGS. 31 and 32 show examples of prior art remote controls.
Figure 32:
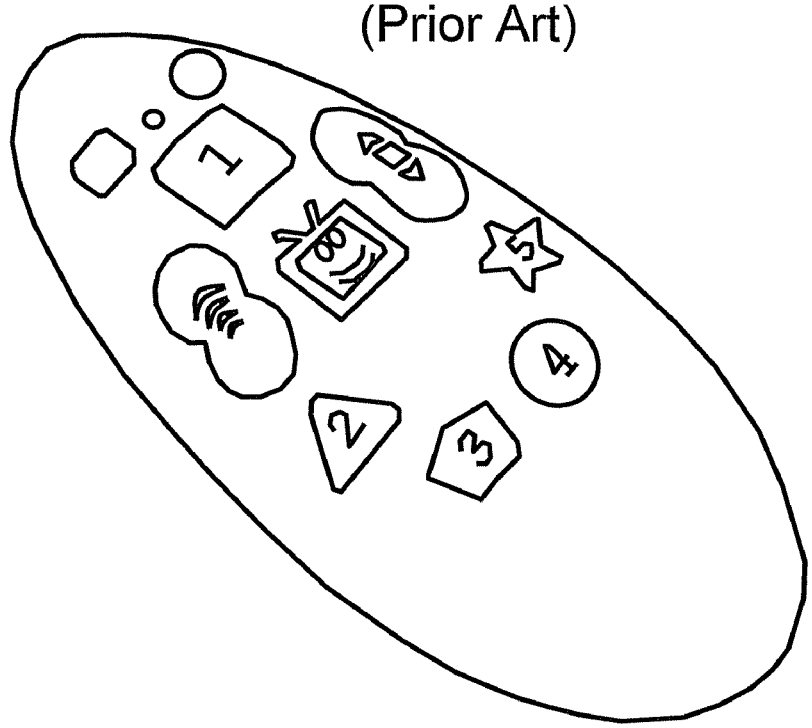

Referring to FIGS. 30A-30B, a multifunction device 3000 having, for instance, a display area 3095 therein, is shown incorporating the control interface of various embodiments. In the device 3000, the control elements are provided as virtual control elements, as they vary in different modes. A user may select from one of a plurality of functional devices, for instance, by actuating selector elements, for instance, in the form of icons 3096. Alternatively, a selector switch may be used, for instance, to switch between different modes.

A control interface region 3040 is depicted including a first mode, shown in FIG. 30A as control interface region 3040a having control elements 3002, 3004, for instance, in the shape of and/or in a position related to ears, for controlling volume of a selected video or audio source, and control elements 3006, 3008 in the shape of and/or in a position related to eyes, for controlling selection of a video source or channel in a video mode and selection of an audio source or channel in an audio or music mode. Note that optional control elements 3010 and 3012 may be included, in the shape of and/or position of a nose and a mouth, respectively. Furthermore, a control interface region 3040 may have a second mode, shown in FIG. 30B as control interface region 3040b, for instance, related to home control features such as lighting (for instance, having, a control interface similar to that shown above with respect to FIG. 12 or 13A-13C), having a slider 3088.

Note that other modes may be provided, including but not limited to clock mode (e.g., wherein control elements are provided that may be similar to any of those shown and described with respect to FIG. 27 or 28), camera mode (e.g., wherein control elements are provided that may be similar to any of those shown and described with respect to FIGS. 29A-29B), bed control mode (e.g., wherein control elements are provided that may be similar to any of those shown and described with respect to FIGS. 22A-26), computer input mode (e.g., wherein control elements are provided that may be similar to any of those shown and described with respect to FIGS. 14-17), a telephone mode (e.g., wherein control elements are provided that may be similar to any of those shown and described with respect to FIGS. 9A-11), audio mode (e.g., wherein control elements are provided that may be similar to any of those shown and described with respect to FIGS. 5A-6), and a video mode (e.g., wherein control elements are provided that may be similar to any of those shown and described with respect to FIGS. 7-8, 14-16). Note that the multifunction device 3000 may control and/or integrate various functional devices including but not limited to those described herein. Furthermore, the multifunction device 3000 may be a portable multifunction device (e.g., similar to various integrated camera-phone-media player devices), or an attached device (e.g. similar to entertainment devices commonly used by passengers in airplanes, or multifunctional devices used by patients in assisted living care or hospital environments).

In certain embodiments, it may be desirable to add functionality as needs or abilities of a user grows. For example, a parent, guardian or caregiver may initially not want a user to change the video display (e.g., television channel). The control elements for the video display, e.g., in the position and/or general shape of eyes, may be removed or disabled accordingly upon initial use. At an appropriate time, the control elements for the video display, e.g., in the position and/or general shape of eyes, may be added or enabled accordingly. Thus, the device may be capable of both de-scalable de-configuration, or scalable re-configuration.

Accordingly, methods are also provided by the invention herein to remotely operate a device or interface with a machine. The method includes controlling audio functions with operation of at least one control element in the shape of an ear or positioned on a body at a location corresponding to an ear on a face. Alternatively, or in combination, a method of operating a remote control comprises controlling video functions with operation of at least one control element in the shape of an eye or positioned on a body at a location corresponding to an eye on a face.

In certain embodiments, media may be programmed specifically for use with the man-machine interfaces described herein. For example, an interactive DVD may be pre-programmed to respond to certain actuations of "ear" position or shape elements, "eye" position or shape elements, "nose" position or shape elements, or "mouth" position or shape elements. Of course, the media may be a DVD as mentioned, or embodied within one or more diskettes, flash memory devices, CD-ROMs, magnetic hard drives, accessible via Internet sites, or combinations comprising at least one of the foregoing media forms. In certain embodiments, interactive media described above may be sold with the man-machine interface. In other embodiments, interactive media described above may be sold separately, or separately created by a user, parent, guardian or caregiver.

As used herein, "animate being" refers to humans, animals, animated characters, dolls, toys (e.g., those including plastic toy figure and detachable plastic body parts for affixing to the toy figure to form various caricatures, such as "Mr. Potato Head®" registered to Hasbro, Inc., Pawtucket, R.I.) puppet characters (including but not limited to those owned by Sesame Workshop Corporation, New York, N.Y., The Muppets Holding Company, LLC of Burbank Calif., or other similar puppet caricatures and fictional characters), any other fictional character (e.g., fictional depictions of humans, animals, extraterrestrial organisms, cyborgs, hybrids, etc.), androids, or the like.

Certain display devices in the configuration of and/or position of a mouth or smile on an animate being are useful for functions associated with turning a device on, for instance, since it can make one happy, or for muting/unmuting a device, as in holding one's finger to the mouth to indicate desired quietness. Certain display devices in the configuration of and/or position of an ear may be useful as associated with volume controls. Certain display devices in the configuration of and/or position of an eye may be useful as associated with images, either to transform the way they look, or to scroll through them. Certain display devices in the configuration of and/or position of a nose are used control off features, as in holding one's nose.

The herein provided devices according to various embodiments of the present invention in the form of remote controls provide an easy to use remote control with limited functions, for example, suitable for those that have trouble with, or do not need, all of the functions available on a standard remote. It is ideal for the elderly, people with Alzheimer's Disease or Dementia, those who are cognitively or visually impaired, those who are physically disabled including arthritis sufferers. It may be set by caregivers. Further, the remote control according to certain embodiments of the present invention may be particularly well suited for children.

The intuitive control elements, for example those based on parts of a face of an animate being, allows for ease of use. For example, one sees with their eyes, so the channel up (+) and channel down (−) buttons are in the elements configured as or in the position of eyes. One hears with their ears, so the volume up (+) and volume down (−) buttons are located on the elements configured as or in the position of ears. When a device is switched in, it may make one smile, so an "ON" in certain embodiments button is located on the smiling mouth. The "OFF" button is on a control element in the configuration of a red stop sign and in the position of nose. These control elements allow one to utilize the natural ability to recognize faces to associate certain functions with elements of a face, providing a user with every possible clue via the configuration and/or position of control elements. Further, certain embodiments of the present invention may satisfy the Principles of Universal Design and their guidelines and/or be based upon the concepts of the Montessori Educational Approach and/or the theory of Retrogenesis.

In certain aspects of the systems described herein, an existing device may be programmed with suitable software and/or firmware to implement the desired virtual control elements. Accordingly, the various embodiments herein include associated code to, for instance, depict the virtual control elements; and to receive user input regarding operations or actions associated with actuation of the control element or programming of the control element (e.g., by a caregiver).

Certain aspects of the method and system described herein can be embodied in the form of computer-implemented processes and apparatuses for practicing those processes. The present method and system can also be embodied in the form of computer program code containing instructions, embodied in tangible media, such as floppy diskettes, CD-ROMs, hard drives, flash memory, or any other computer-readable storage medium, wherein, when the computer program code loaded into and executed by a computer, the computer becomes an apparatus for practicing certain aspects of the method and system. Certain aspects of the present method and system can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing certain aspects of the method and system. When the implementation is on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A telephonic device including a control interface, said control interface comprising:
    at least one control element in the form of, or positioned in a configuration on the control device corresponding to, a part of a face; wherein the control element performs a function of the device associated with the part of the face.

2. The telephonic device as in claim 1, wherein the at least one control element is in the shape of a mouth, wherein upon activation of the control element in the shape of a mouth, the telephonic device answers an incoming telephone call or places an outgoing telephone call.

3. The telephonic device as in claim 1, wherein the at least one control element is in the position of a mouth, wherein upon activation of the control element in the position of a mouth, the telephonic device answers an incoming telephone call or places an outgoing telephone call.

4. The telephonic device as in claim 1, wherein the at least one control element is in the shape of and position of a mouth, wherein upon activation of the control element in the shape of and position of a mouth, the telephonic device answers an incoming telephone call or places an outgoing telephone call.

5. The telephonic device as in claim 1, wherein the at least one control element is in the shape of an eye, wherein upon activation of the control element in the shape of an eye, the telephonic device displays one or more stored numbers.

6. The telephonic device as in claim 1, wherein the at least one control element is in the position of an eye, wherein upon activation of the control element in the position of an eye, the telephonic device displays one or more stored numbers.

7. The telephonic device as in claim 1, wherein the at least one control element is in the shape of and position of an eye, wherein upon activation of the control element in the shape of and position of an eye, the telephonic device displays one or more stored numbers.

8. The telephonic device as in claim 1, wherein the at least one control element is in the shape of an ear, wherein upon activation of the control element in the shape of an ear, the telephonic device adjusts a control associated with the volume of the telephonic device.

9. The telephonic device as in claim 1, wherein the at least one control element is in the position of an ear, wherein upon activation of the control element in the position of an ear, the telephonic device adjusts a control associated with the volume of the telephonic device.

10. The telephonic device as in claim 1, wherein the at least one control element is in the shape of and position of an ear, wherein upon activation of the control element in the shape of and position of an ear, the telephonic device adjusts a control associated with the volume of the telephonic device.

* * * * *